US010523680B2

(12) United States Patent
Turgeman et al.

(10) Patent No.: US 10,523,680 B2
(45) Date of Patent: *Dec. 31, 2019

(54) SYSTEM, DEVICE, AND METHOD FOR DETECTING A PROXY SERVER

(71) Applicant: BioCatch Ltd., Tel Aviv (IL)

(72) Inventors: Avi Turgeman, Cambridge, MA (US); Yaron Lehmann, Tel Aviv (IL); Yaron Azizi, Sderot (IL); Itai Novick, Rehovot (IL)

(73) Assignee: BIOCATCH LTD., Tel Aviv (IL)

( * ) Notice: Subject to any disclaimer, the term of this patent is extended or adjusted under 35 U.S.C. 154(b) by 14 days.

This patent is subject to a terminal disclaimer.

(21) Appl. No.: 16/057,825

(22) Filed: Aug. 8, 2018

(65) Prior Publication Data

US 2018/0351959 A1 Dec. 6, 2018

Related U.S. Application Data

(63) Continuation of application No. 15/203,817, filed on Jul. 7, 2016, now Pat. No. 10,069,837.
(Continued)

(51) Int. Cl.
*G06F 7/04* (2006.01)
*H04L 29/06* (2006.01)
(Continued)

(52) U.S. Cl.
CPC .......... *H04L 63/102* (2013.01); *H04L 47/283* (2013.01); *H04L 61/1511* (2013.01);
(Continued)

(58) Field of Classification Search
CPC ...... G06F 21/316; G06F 21/32; G06F 21/552; G06F 21/00; G06F 21/121; G06F 21/554;
(Continued)

(56) References Cited

U.S. PATENT DOCUMENTS 3,618,019 A 11/1971 Nemirovsky
3,699,517 A 10/1972 Dyche
(Continued)

FOREIGN PATENT DOCUMENTS

EP 2410450 1/2012
EP 2410450 A1 1/2012
(Continued)

OTHER PUBLICATIONS

International Search Report for PCT international application PCT/IL2018/051246, dated Mar. 11, 2019.
(Continued)

*Primary Examiner* — Gary S Gracia
(74) *Attorney, Agent, or Firm* — Eitan Mehulal Sadot

(57) ABSTRACT

Devices, systems, and methods of detecting whether an electronic device or computerized device or computer, is communicating with a computerized service or a trusted server directly and without an intermediary web-proxy, or indirectly by utilizing a proxy server or web-proxy. The system searches for particular characteristics or attributes, that characterize a proxy-based communication session or channel and that do not characterize a direct non-proxy-based communication session or channel; or conversely, the system searches for particular characteristics or attributes, that characterize a direct non-proxy-based communication session or channel and that do not characterize a proxy-based communication session or channel; and based on these characteristics, determines whether or not a proxy server exists and operates.

24 Claims, 5 Drawing Sheets

Related U.S. Application Data

(60) Provisional application No. 62/190,264, filed on Jul. 9, 2015.

(51) Int. Cl.
  *H04L 29/08* (2006.01)
  *H04L 12/841* (2013.01)
  *H04L 29/12* (2006.01)
  *H04W 12/12* (2009.01)
  *H04L 5/00* (2006.01)

(52) U.S. Cl.
  CPC .......... *H04L 63/08* (2013.01); *H04L 67/2804* (2013.01); *H04L 69/16* (2013.01); *H04L 69/22* (2013.01); *H04W 12/12* (2013.01); *H04L 5/0055* (2013.01)

(58) Field of Classification Search
  CPC ....... G06F 21/56; G06F 21/31; H04L 47/283; H04L 5/0055; H04L 61/1511; H04L 63/08; H04L 63/102; H04L 67/2804; H04L 69/16; H04L 69/22
  USPC ........ 713/155, 168, 169; 726/1, 2, 5, 12, 14, 726/22, 24
  See application file for complete search history.

(56) References Cited

U.S. PATENT DOCUMENTS

| | | |
|---|---|---|
| 3,983,535 A | 9/1976 | Herbst |
| 4,128,829 A | 12/1978 | Herbst |
| 4,621,334 A | 11/1986 | Garcia |
| 4,760,386 A | 7/1988 | Heath |
| 4,805,222 A | 2/1989 | Young |
| 5,305,238 A | 4/1994 | Starr |
| 5,442,342 A | 8/1995 | Kung |
| 5,485,171 A | 1/1996 | Copper |
| 5,557,686 A | 9/1996 | Brown |
| 5,565,657 A | 10/1996 | Merz |
| 5,581,261 A | 12/1996 | Hickman |
| 5,838,306 A | 11/1998 | O'Connor |
| 5,874,941 A | 2/1999 | Yamada |
| 5,999,162 A | 12/1999 | Takahashi |
| 6,202,023 B1 | 3/2001 | Hancock |
| 6,337,686 B2 | 1/2002 | Wong |
| 6,337,919 B1 | 1/2002 | Dunton |
| 6,442,692 B1 | 8/2002 | Zilberman |
| 6,572,014 B1 | 6/2003 | Lambert |
| 6,819,219 B1 | 11/2004 | Bolle |
| 6,836,554 B1 | 12/2004 | Bolle |
| 6,895,514 B1 | 5/2005 | Kermani |
| 6,931,131 B1 | 8/2005 | Becker |
| 6,938,061 B1 | 8/2005 | Rumynin |
| 6,938,159 B1 | 8/2005 | O'Connor |
| 6,957,185 B1 | 10/2005 | Labaton |
| 6,957,186 B1 | 10/2005 | Guheen |
| 6,983,061 B2 | 1/2006 | Ikegami |
| 7,092,926 B2 | 8/2006 | Cerrato |
| 7,130,452 B2 | 10/2006 | Bolle |
| 7,133,792 B2 | 11/2006 | Murakami |
| 7,139,916 B2 | 11/2006 | Billingsley |
| 7,158,118 B2 | 1/2007 | Liberty |
| 7,236,156 B2 | 6/2007 | Liberty |
| 7,245,218 B2 | 7/2007 | Ikehara |
| 7,366,919 B1 | 4/2008 | Sobel |
| 7,395,436 B1 | 7/2008 | Nemovicher |
| 7,494,061 B2 | 2/2009 | Reinhold |
| 7,523,191 B1 | 4/2009 | Thomas |
| 7,535,456 B2 | 5/2009 | Liberty |
| 7,606,915 B1 | 10/2009 | Calinov |
| 7,796,013 B2 | 9/2010 | Murakami |
| 7,818,290 B2 | 10/2010 | Davis |
| 7,860,870 B2 | 12/2010 | Sadagopan |
| 8,031,175 B2 | 10/2011 | Rigazio |
| 8,065,624 B2 | 11/2011 | Morin |
| 8,125,312 B2 | 2/2012 | Orr |
| 8,156,324 B1 | 4/2012 | Shnowske |
| 8,201,222 B2 | 6/2012 | Inoue |
| 8,285,658 B1 | 10/2012 | Kellas-Dicks |
| 8,417,960 B2 | 4/2013 | Takahashi |
| 8,433,785 B2 | 4/2013 | Awadallah |
| 8,449,393 B2 | 5/2013 | Sobel |
| 8,499,245 B1 | 7/2013 | Froment |
| 8,510,113 B1 | 8/2013 | Conkie |
| 8,548,208 B2 | 10/2013 | Schultz |
| 8,549,629 B1 | 10/2013 | Mccreesh |
| 8,555,077 B2 | 10/2013 | Davis |
| 8,745,729 B2 | 6/2014 | Poluri |
| 8,788,838 B1 | 8/2014 | Fadell |
| 8,803,797 B2 | 8/2014 | Scott |
| 8,819,812 B1 | 8/2014 | Weber |
| 8,832,823 B2 | 9/2014 | Boss |
| 8,838,060 B2 | 9/2014 | Walley |
| 8,880,441 B1 | 11/2014 | Chen |
| 8,898,787 B2 | 11/2014 | Thompson |
| 8,938,787 B2 | 1/2015 | Turgeman |
| 8,941,466 B2 | 1/2015 | Bayram |
| 8,990,959 B2 | 3/2015 | Zhu |
| 9,069,942 B2 | 6/2015 | Turgeman |
| 9,071,969 B2 | 6/2015 | Turgeman |
| 9,154,534 B1 | 10/2015 | Gayles |
| 9,174,123 B2 | 11/2015 | Nasiri |
| 9,195,351 B1 | 11/2015 | Rosenberg |
| 9,275,337 B2 | 3/2016 | Turgeman |
| 9,282,112 B2 | 3/2016 | Filatov |
| 9,301,140 B1 | 3/2016 | Costigan |
| 9,304,915 B2 | 4/2016 | Adams |
| 9,418,221 B2 | 8/2016 | Turgeman |
| 9,450,971 B2 | 9/2016 | Turgeman |
| 9,477,826 B2 | 10/2016 | Turgeman |
| 9,483,292 B2 | 11/2016 | Turgeman |
| 9,526,006 B2 | 12/2016 | Turgeman |
| 9,529,987 B2 | 12/2016 | Deutschmann |
| 9,531,701 B2 | 12/2016 | Turgeman |
| 9,531,733 B2 | 12/2016 | Turgeman |
| 9,536,071 B2 | 1/2017 | Turgeman |
| 9,541,995 B2 | 1/2017 | Turgeman |
| 9,547,766 B2 | 1/2017 | Turgeman |
| 9,552,470 B2 | 1/2017 | Turgeman |
| 9,558,339 B2 | 1/2017 | Turgeman |
| 9,589,120 B2 | 3/2017 | Samuel |
| 9,621,567 B2 | 4/2017 | Turgeman |
| 9,626,677 B2 | 4/2017 | Turgeman |
| 9,665,703 B2 | 5/2017 | Turgeman |
| 9,674,218 B2 | 6/2017 | Turgeman |
| 9,690,915 B2 | 6/2017 | Turgeman |
| 9,703,953 B2 | 7/2017 | Turgeman |
| 9,710,316 B1 | 7/2017 | Chheda |
| 9,712,558 B2 | 7/2017 | Turgeman |
| 9,747,436 B2 | 8/2017 | Turgeman |
| 9,779,423 B2 | 10/2017 | Turgeman |
| 9,838,373 B2 | 12/2017 | Turgeman |
| 9,848,009 B2 | 12/2017 | Turgeman |
| 9,927,883 B1 | 3/2018 | Lin |
| 10,032,010 B2 | 7/2018 | Turgeman |
| 10,037,421 B2 | 7/2018 | Turgeman |
| 10,049,209 B2 | 8/2018 | Turgeman |
| 10,055,560 B2 | 8/2018 | Turgeman |
| 10,069,837 B2 | 9/2018 | Turgeman |
| 10,069,852 B2 | 9/2018 | Turgeman |
| 10,079,853 B2 | 9/2018 | Turgeman |
| 10,083,439 B2 | 9/2018 | Turgeman |
| 10,164,985 B2 | 12/2018 | Turgeman |
| 10,198,122 B2 | 2/2019 | Turgeman |
| 10,262,324 B2 | 4/2019 | Turgeman |
| 10,298,614 B2 | 5/2019 | Turgeman |
| 2001/0004733 A1* | 6/2001 | Eldering ............ G06Q 20/20 705/14.41 |
| 2002/0023229 A1* | 2/2002 | Hangai ............... G06F 21/32 726/21 |
| 2002/0089412 A1* | 7/2002 | Heger ............... G06F 3/0338 345/157 |

(56) References Cited

U.S. PATENT DOCUMENTS

| | | | |
|---|---|---|---|
| 2003/0033526 A1* | 2/2003 | French | G06F 21/31 713/168 |
| 2003/0074201 A1* | 4/2003 | Grashey | G10L 17/22 704/273 |
| 2003/0137494 A1* | 7/2003 | Tulbert | G06F 3/0423 345/173 |
| 2003/0212811 A1* | 11/2003 | Thornton | G06F 3/1431 709/231 |
| 2004/0015714 A1* | 1/2004 | Abraham | G06Q 20/3821 726/4 |
| 2004/0017355 A1* | 1/2004 | Shim | G06F 3/0338 345/157 |
| 2004/0021643 A1* | 2/2004 | Hoshino | G06F 3/016 345/173 |
| 2004/0034784 A1* | 2/2004 | Fedronic | G06F 21/32 713/186 |
| 2004/0062423 A1* | 4/2004 | Doi | G06K 9/00221 382/118 |
| 2004/0111523 A1* | 6/2004 | Hall | H04L 29/06 709/230 |
| 2004/0123156 A1* | 6/2004 | Hammond, II | H04L 9/0891 726/4 |
| 2004/0143737 A1* | 7/2004 | Teicher | G06K 7/1095 713/167 |
| 2004/0186882 A1 | 9/2004 | Ting | |
| 2004/0221171 A1* | 11/2004 | Ahmed | G06F 21/316 726/23 |
| 2005/0008148 A1* | 1/2005 | Jacobson | G06F 3/038 380/26 |
| 2005/0060138 A1* | 3/2005 | Wang | G06F 3/018 704/1 |
| 2005/0179657 A1* | 8/2005 | Russo | G06F 3/038 345/163 |
| 2005/0289264 A1* | 12/2005 | Illowsky | G06F 1/3203 710/104 |
| 2006/0006803 A1* | 1/2006 | Huang | H01J 61/0672 313/607 |
| 2006/0080263 A1* | 4/2006 | Willis | G06F 21/33 705/76 |
| 2006/0090073 A1* | 4/2006 | Steinberg | G06F 21/31 713/170 |
| 2006/0123101 A1* | 6/2006 | Buccella | G06F 21/552 709/223 |
| 2006/0143454 A1* | 6/2006 | Walmsley | G06F 21/85 713/170 |
| 2006/0195328 A1* | 8/2006 | Abraham | G06Q 20/204 235/382 |
| 2006/0215886 A1* | 9/2006 | Black | G06K 9/0002 382/124 |
| 2006/0224898 A1 | 10/2006 | Ahmed | |
| 2006/0282660 A1* | 12/2006 | Varghese | G06Q 20/341 713/155 |
| 2006/0284969 A1* | 12/2006 | Kim | G06F 21/316 348/14.01 |
| 2007/0118804 A1* | 5/2007 | Raciborski | G06F 3/0482 715/745 |
| 2007/0156443 A1* | 7/2007 | Gurvey | G06Q 10/02 705/64 |
| 2007/0174082 A1* | 7/2007 | Singh | G06Q 20/20 705/44 |
| 2007/0183633 A1* | 8/2007 | Hoffmann | G06K 9/00221 382/116 |
| 2007/0214426 A1* | 9/2007 | Ruelle | G06F 3/0481 715/767 |
| 2007/0226797 A1 | 9/2007 | Thompson | |
| 2007/0236330 A1* | 10/2007 | Cho | G06F 21/35 340/5.54 |
| 2007/0240230 A1* | 10/2007 | O'Connell | G06F 21/55 726/28 |
| 2007/0250920 A1* | 10/2007 | Lindsay | G06F 21/31 726/7 |
| 2007/0255821 A1* | 11/2007 | Ge | G06Q 10/00 709/224 |
| 2007/0266305 A1* | 11/2007 | Cong | G06Q 30/02 715/700 |
| 2007/0271466 A1* | 11/2007 | Mak | G06F 21/316 713/184 |
| 2007/0283416 A1* | 12/2007 | Renaud | G06F 21/31 726/2 |
| 2008/0046982 A1* | 2/2008 | Parkinson | H04L 9/0891 726/5 |
| 2008/0059474 A1* | 3/2008 | Lim | G06F 21/604 |
| 2008/0068343 A1* | 3/2008 | Hoshino | G06F 3/016 345/173 |
| 2008/0084972 A1* | 4/2008 | Burke | G06Q 10/107 379/88.02 |
| 2008/0091639 A1* | 4/2008 | Davis | G06Q 30/02 |
| 2008/0092209 A1* | 4/2008 | Davis | G06F 21/316 726/2 |
| 2008/0092245 A1* | 4/2008 | Alward | G06F 21/316 726/28 |
| 2008/0097851 A1* | 4/2008 | Bemmel | G06Q 30/02 705/14.36 |
| 2008/0098456 A1* | 4/2008 | Alward | G06F 21/316 726/1 |
| 2008/0120717 A1* | 5/2008 | Shakkarwar | G06F 21/33 726/18 |
| 2008/0136790 A1* | 6/2008 | Hio | G06F 3/04817 345/173 |
| 2008/0162449 A1* | 7/2008 | Chao-Yu | G06F 21/51 |
| 2008/0183745 A1* | 7/2008 | Cancel | G06Q 30/02 |
| 2008/0192005 A1* | 8/2008 | Elgoyhen | G06F 3/014 345/158 |
| 2008/0200310 A1* | 8/2008 | Tagliabue | A63B 24/0062 482/8 |
| 2008/0211766 A1* | 9/2008 | Westerman | G06F 3/038 345/156 |
| 2008/0215576 A1* | 9/2008 | Zhao | G06F 16/337 |
| 2008/0263636 A1* | 10/2008 | Gusler | G06F 21/316 726/4 |
| 2008/0298588 A1* | 12/2008 | Shakkarwar | G06Q 20/02 380/255 |
| 2008/0301808 A1* | 12/2008 | Calo | G06F 21/55 726/23 |
| 2008/0306897 A1 | 12/2008 | Liu | |
| 2009/0037983 A1* | 2/2009 | Chiruvolu | G06F 21/31 726/4 |
| 2009/0038010 A1* | 2/2009 | Ma | G06F 11/3672 726/23 |
| 2009/0089879 A1* | 4/2009 | Wang | G06F 21/53 726/24 |
| 2009/0094311 A1* | 4/2009 | Awadallah | H04L 63/1408 709/202 |
| 2009/0132395 A1* | 5/2009 | Lam | G06Q 30/02 705/30 |
| 2009/0157792 A1* | 6/2009 | Fiatal | G06Q 30/04 709/201 |
| 2009/0172551 A1 | 7/2009 | Kane | |
| 2009/0189736 A1* | 7/2009 | Hayashi | G06F 21/32 340/5.81 |
| 2009/0199296 A1* | 8/2009 | Xie | G06F 21/316 726/23 |
| 2009/0227232 A1* | 9/2009 | Matas | H04M 1/665 455/411 |
| 2009/0241188 A1* | 9/2009 | Komura | H04L 63/1416 726/22 |
| 2009/0254336 A1* | 10/2009 | Dumais | G06F 9/451 704/9 |
| 2009/0281979 A1* | 11/2009 | Tysowski | G06F 3/0237 706/52 |
| 2009/0293119 A1* | 11/2009 | Jonsson | G06F 21/36 726/19 |
| 2009/0320123 A1* | 12/2009 | Yu | G06F 21/316 726/16 |
| 2010/0007632 A1* | 1/2010 | Yamazaki | H01L 27/3234 345/175 |

(56) References Cited

U.S. PATENT DOCUMENTS

| | | | |
|---|---|---|---|
| 2010/0040293 A1* | 2/2010 | Hermann | G06K 9/00355 382/218 |
| 2010/0042387 A1 | 2/2010 | Gibbon | |
| 2010/0042403 A1* | 2/2010 | Chandrasekar | G06F 17/27 704/9 |
| 2010/0046806 A1* | 2/2010 | Baughman | G06F 21/316 382/115 |
| 2010/0070405 A1* | 3/2010 | Joa | G06Q 20/10 705/38 |
| 2010/0077470 A1* | 3/2010 | Kozat | H04L 63/14 726/11 |
| 2010/0082747 A1* | 4/2010 | Yue | G06F 16/954 709/204 |
| 2010/0082998 A1* | 4/2010 | Kohavi | G06F 21/36 713/182 |
| 2010/0115610 A1* | 5/2010 | Tredoux | G06F 21/316 726/19 |
| 2010/0122082 A1* | 5/2010 | Deng | H04L 63/0421 713/159 |
| 2010/0125816 A1* | 5/2010 | Bezos | G06F 1/1626 715/863 |
| 2010/0138370 A1* | 6/2010 | Wu | G06Q 30/02 706/12 |
| 2010/0164897 A1* | 7/2010 | Morin | G06F 3/0237 345/173 |
| 2010/0171753 A1* | 7/2010 | Kwon | G06F 1/3218 345/593 |
| 2010/0197352 A1* | 8/2010 | Runstedler | G06F 3/0233 455/566 |
| 2010/0269165 A1* | 10/2010 | Chen | G06F 21/316 726/7 |
| 2010/0281539 A1* | 11/2010 | Burns | H04L 63/1441 726/23 |
| 2010/0284532 A1 | 11/2010 | Burnett | |
| 2010/0287229 A1* | 11/2010 | Hauser | G06F 21/316 709/203 |
| 2010/0321304 A1* | 12/2010 | Rofougaran | G06F 3/046 345/173 |
| 2010/0328074 A1* | 12/2010 | Johnson | G06F 21/32 340/573.1 |
| 2011/0010209 A1* | 1/2011 | McNally | G06Q 10/06 705/7.11 |
| 2011/0012829 A1* | 1/2011 | Yao | G06F 3/045 345/157 |
| 2011/0016320 A1* | 1/2011 | Bergsten | H04L 63/08 713/170 |
| 2011/0016534 A1* | 1/2011 | Jakobsson | G06F 21/316 726/28 |
| 2011/0018828 A1* | 1/2011 | Wu | G06F 3/04883 345/173 |
| 2011/0023115 A1* | 1/2011 | Wright | G06F 21/552 726/22 |
| 2011/0029902 A1* | 2/2011 | Bailey | G06F 21/36 715/764 |
| 2011/0039529 A1 | 2/2011 | Kim | |
| 2011/0039602 A1* | 2/2011 | McNamara | G06F 3/017 455/566 |
| 2011/0043475 A1* | 2/2011 | Rigazio | G06F 3/04883 345/173 |
| 2011/0050394 A1* | 3/2011 | Zhang | G06F 3/045 340/5.82 |
| 2011/0063211 A1* | 3/2011 | Hoerl | H04L 41/04 345/157 |
| 2011/0065504 A1* | 3/2011 | Dugan | A63F 13/212 463/31 |
| 2011/0102570 A1* | 5/2011 | Wilf | G06F 3/017 348/77 |
| 2011/0105859 A1* | 5/2011 | Popovic | A61B 5/0205 600/301 |
| 2011/0113388 A1* | 5/2011 | Eisen | G06F 21/32 715/856 |
| 2011/0119370 A1* | 5/2011 | Huang | H04L 43/14 709/224 |
| 2011/0154273 A1* | 6/2011 | Aburada | G03F 1/36 716/52 |
| 2011/0159650 A1* | 6/2011 | Shiraishi | H01L 29/0856 438/269 |
| 2011/0159850 A1* | 6/2011 | Faith | G06Q 30/0201 455/411 |
| 2011/0162076 A1* | 6/2011 | Song | G06F 21/554 726/26 |
| 2011/0191820 A1* | 8/2011 | Ivey | G06F 16/00 726/3 |
| 2011/0193737 A1* | 8/2011 | Chiueh | G08C 23/02 341/176 |
| 2011/0202453 A1* | 8/2011 | Issa | G06Q 10/00 705/39 |
| 2011/0221684 A1* | 9/2011 | Rydenhag | G06F 3/041 345/173 |
| 2011/0223888 A1* | 9/2011 | Esaki | G06F 21/32 455/411 |
| 2011/0225644 A1* | 9/2011 | Pullikottil | H04L 63/1425 726/11 |
| 2011/0246902 A1* | 10/2011 | Tsai | G06F 3/038 715/740 |
| 2011/0248941 A1* | 10/2011 | Abdo | G06F 3/0488 345/173 |
| 2011/0251823 A1 | 10/2011 | Davis et al. | |
| 2011/0271342 A1* | 11/2011 | Chung | G06F 21/554 726/23 |
| 2011/0276414 A1* | 11/2011 | Subbarao | G06Q 20/102 705/14.73 |
| 2011/0304531 A1* | 12/2011 | Brooks | G06F 1/1626 345/156 |
| 2011/0320822 A1* | 12/2011 | Lind | G06F 21/316 713/182 |
| 2012/0005483 A1* | 1/2012 | Patvarczki | G06F 21/36 713/182 |
| 2012/0005719 A1* | 1/2012 | McDougal | G06F 21/562 726/1 |
| 2012/0007821 A1* | 1/2012 | Zaliva | G06F 3/03547 345/173 |
| 2012/0054834 A1* | 3/2012 | King | G06F 21/31 726/4 |
| 2012/0096555 A1* | 4/2012 | Mahaffey | G06F 21/564 726/24 |
| 2012/0102551 A1* | 4/2012 | Bidare | G06F 21/36 726/4 |
| 2012/0113061 A1* | 5/2012 | Ikeda | G06F 3/041 345/175 |
| 2012/0124662 A1* | 5/2012 | Baca | G06F 21/32 726/17 |
| 2012/0133055 A1* | 5/2012 | Machida | H01L 24/06 257/777 |
| 2012/0151044 A1* | 6/2012 | Luna | H04W 4/18 709/224 |
| 2012/0151559 A1* | 6/2012 | Koudys | G06F 21/316 726/3 |
| 2012/0154173 A1* | 6/2012 | Chang | G01S 7/032 340/904 |
| 2012/0154273 A1* | 6/2012 | McDade, Sr. | G06F 3/0338 345/157 |
| 2012/0154823 A1* | 6/2012 | Sakamoto | G03B 27/32 356/620 |
| 2012/0158503 A1* | 6/2012 | Mardikar | G06Q 30/0269 705/14.53 |
| 2012/0159599 A1* | 6/2012 | Szoke | G06F 21/32 726/7 |
| 2012/0164978 A1* | 6/2012 | Conti | G06F 21/32 455/411 |
| 2012/0167170 A1* | 6/2012 | Shi | G06F 21/2 726/2 |
| 2012/0167204 A1 | 6/2012 | Akka | |
| 2012/0174213 A1* | 7/2012 | Geiger | G06F 3/04883 726/19 |
| 2012/0188198 A1* | 7/2012 | Jeong | G06F 3/044 345/174 |

(56) References Cited

U.S. PATENT DOCUMENTS

| | | | |
|---|---|---|---|
| 2012/0204257 A1* | 8/2012 | O'Connell | G06Q 30/06 726/19 |
| 2012/0218193 A1* | 8/2012 | Weber | G06F 1/1626 345/173 |
| 2012/0246737 A1* | 9/2012 | Paxton | G06F 21/316 726/27 |
| 2012/0252410 A1* | 10/2012 | Williams | G06F 21/36 455/411 |
| 2012/0278804 A1* | 11/2012 | Narayanasamy | G06F 9/45558 718/1 |
| 2012/0284380 A1* | 11/2012 | Anderson, III | H04L 29/06 709/223 |
| 2013/0024239 A1* | 1/2013 | Baker | G06Q 40/06 705/7.28 |
| 2013/0036416 A1* | 2/2013 | Raju | G06F 9/45558 718/1 |
| 2013/0076650 A1* | 3/2013 | Vik | G06F 3/0418 345/173 |
| 2013/0088434 A1* | 4/2013 | Masuda | G06F 1/3262 345/173 |
| 2013/0097682 A1* | 4/2013 | Zeljkovic | H04L 9/3231 726/7 |
| 2013/0097706 A1* | 4/2013 | Titonis | G06F 21/56 726/24 |
| 2013/0111586 A1* | 5/2013 | Jackson | G06F 11/3438 726/23 |
| 2013/0133055 A1* | 5/2013 | Ali | H04L 63/0861 726/7 |
| 2013/0135218 A1* | 5/2013 | Jain | G06F 3/0488 345/173 |
| 2013/0139248 A1* | 5/2013 | Rhee | G06F 3/0346 726/19 |
| 2013/0154999 A1* | 6/2013 | Guard | G06F 3/0487 345/174 |
| 2013/0162603 A1* | 6/2013 | Peng | G06F 3/0416 345/178 |
| 2013/0167212 A1* | 6/2013 | Azar | G06F 21/32 726/7 |
| 2013/0173737 A1* | 7/2013 | Liu | H04N 21/23439 709/213 |
| 2013/0212674 A1* | 8/2013 | Boger | G06F 21/36 726/17 |
| 2013/0226992 A1* | 8/2013 | Bapst | H04L 67/42 709/203 |
| 2013/0239195 A1* | 9/2013 | Turgeman | G06F 21/316 726/7 |
| 2013/0239206 A1* | 9/2013 | Draluk | G06F 21/00 726/19 |
| 2013/0282637 A1* | 10/2013 | Costigan | G06N 5/022 706/46 |
| 2013/0288647 A1 | 10/2013 | Turgeman | |
| 2013/0305357 A1* | 11/2013 | Ayyagari | H04W 12/06 726/22 |
| 2013/0312097 A1* | 11/2013 | Turnbull | G06F 21/55 726/24 |
| 2013/0335349 A1* | 12/2013 | Ferren | G06K 9/3266 345/173 |
| 2014/0033317 A1* | 1/2014 | Barber | G06Q 30/0242 726/26 |
| 2014/0041020 A1* | 2/2014 | Zhao | G06F 21/36 726/19 |
| 2014/0078061 A1* | 3/2014 | Simons | G06F 3/03543 345/163 |
| 2014/0078193 A1* | 3/2014 | Barnhoefer | G09G 3/3406 345/690 |
| 2014/0082369 A1* | 3/2014 | Waclawsky | G06F 21/62 713/189 |
| 2014/0111451 A1* | 4/2014 | Park | G06F 3/04883 345/173 |
| 2014/0118520 A1* | 5/2014 | Slaby | G06K 9/00926 348/77 |
| 2014/0143304 A1* | 5/2014 | Hegarty | G06F 11/3438 709/203 |
| 2014/0168093 A1 | 6/2014 | Lawrence | |
| 2014/0196119 A1* | 7/2014 | Hill | G06F 21/32 726/4 |
| 2014/0200953 A1* | 7/2014 | Mun | G06Q 10/04 705/7.28 |
| 2014/0250538 A1* | 9/2014 | Rapaport | G06F 21/31 726/28 |
| 2014/0259130 A1* | 9/2014 | Li | G06F 21/31 726/6 |
| 2014/0270571 A1* | 9/2014 | Dwan | H04N 1/00453 382/276 |
| 2014/0283059 A1* | 9/2014 | Sambamurthy | G06F 21/55 726/23 |
| 2014/0317028 A1 | 10/2014 | Turgeman | |
| 2014/0317726 A1 | 10/2014 | Turgeman | |
| 2014/0317734 A1* | 10/2014 | Valencia | G06F 21/552 726/22 |
| 2014/0317744 A1 | 10/2014 | Turgeman | |
| 2014/0325223 A1 | 10/2014 | Turgeman | |
| 2014/0325645 A1 | 10/2014 | Turgeman | |
| 2014/0325646 A1 | 10/2014 | Turgeman | |
| 2014/0325682 A1 | 10/2014 | Turgeman | |
| 2014/0337786 A1* | 11/2014 | Luo | G06F 3/0416 715/773 |
| 2014/0344927 A1* | 11/2014 | Turgeman | H04W 12/06 726/22 |
| 2015/0002479 A1* | 1/2015 | Kawamura | G06F 3/0414 345/178 |
| 2015/0012920 A1* | 1/2015 | De Santis | G06F 9/45533 718/1 |
| 2015/0062078 A1* | 3/2015 | Christman | G06F 3/0425 345/174 |
| 2015/0091858 A1* | 4/2015 | Rosenberg | G06F 3/0414 345/174 |
| 2015/0094030 A1 | 4/2015 | Turgeman | |
| 2015/0101031 A1* | 4/2015 | Harjanto | H04L 63/0876 726/7 |
| 2015/0146945 A1* | 5/2015 | Han | G06K 9/00033 382/125 |
| 2015/0205944 A1 | 7/2015 | Turgeman | |
| 2015/0205955 A1 | 7/2015 | Turgeman | |
| 2015/0205957 A1 | 7/2015 | Turgeman | |
| 2015/0205958 A1 | 7/2015 | Turgeman | |
| 2015/0212843 A1 | 7/2015 | Turgeman | |
| 2015/0213244 A1* | 7/2015 | Lymberopoulos | G06F 21/32 726/18 |
| 2015/0213246 A1 | 7/2015 | Turgeman | |
| 2015/0213251 A1* | 7/2015 | Turgeman | G06F 21/36 726/7 |
| 2015/0256528 A1 | 9/2015 | Turgeman | |
| 2015/0256556 A1 | 9/2015 | Kaminsky | |
| 2015/0264572 A1 | 9/2015 | Turgeman | |
| 2015/0268768 A1* | 9/2015 | Woodhull | G06F 3/0418 345/168 |
| 2015/0310196 A1 | 10/2015 | Turgeman et al. | |
| 2016/0006800 A1* | 1/2016 | Summers | G06F 9/5055 709/203 |
| 2016/0034673 A1 | 2/2016 | Chandra | |
| 2016/0042164 A1 | 2/2016 | Goldsmith et al. | |
| 2016/0077620 A1 | 3/2016 | Choi | |
| 2016/0109969 A1 | 4/2016 | Keating | |
| 2016/0132105 A1 | 5/2016 | Turgeman | |
| 2016/0164905 A1 | 6/2016 | Pinney Wood et al. | |
| 2016/0164906 A1 | 6/2016 | Pinney Wood et al. | |
| 2016/0174044 A1 | 6/2016 | Jones | |
| 2016/0179245 A1 | 6/2016 | Johansson | |
| 2016/0191237 A1 | 6/2016 | Roth | |
| 2016/0196414 A1 | 7/2016 | Stuntebeck | |
| 2016/0197918 A1 | 7/2016 | Turgeman | |
| 2016/0209948 A1 | 7/2016 | Tulbert | |
| 2016/0226865 A1 | 8/2016 | Chen | |
| 2016/0294837 A1 | 10/2016 | Turgeman | |
| 2016/0300054 A1 | 10/2016 | Turgeman | |
| 2016/0306974 A1 | 10/2016 | Turgeman | |
| 2016/0307191 A1 | 10/2016 | Turgeman | |

(56) References Cited

U.S. PATENT DOCUMENTS

| | | |
|---|---|---|
| 2016/0307201 A1 | 10/2016 | Turgeman |
| 2016/0321445 A1 | 11/2016 | Turgeman |
| 2016/0321689 A1 | 11/2016 | Turgeman |
| 2016/0342826 A1 | 11/2016 | Apostolos |
| 2016/0344783 A1 | 11/2016 | Kushimoto |
| 2016/0364138 A1 | 12/2016 | Luo |
| 2016/0366177 A1 | 12/2016 | Turgeman |
| 2016/0371476 A1 | 12/2016 | Turgeman |
| 2017/0011217 A1 | 1/2017 | Turgeman |
| 2017/0012988 A1 | 1/2017 | Turgeman |
| 2017/0017781 A1 | 1/2017 | Turgeman |
| 2017/0032114 A1 | 2/2017 | Turgeman |
| 2017/0034210 A1 | 2/2017 | Talmor |
| 2017/0048272 A1 | 2/2017 | Yamamura et al. |
| 2017/0054702 A1 | 2/2017 | Turgeman |
| 2017/0076089 A1 | 3/2017 | Turgeman |
| 2017/0085587 A1 | 3/2017 | Turgeman |
| 2017/0090418 A1 | 3/2017 | Tsang |
| 2017/0091450 A1 | 3/2017 | Turgeman |
| 2017/0126735 A1 | 5/2017 | Turgeman |
| 2017/0140279 A1 | 5/2017 | Turgeman |
| 2017/0149958 A1 | 5/2017 | Xian |
| 2017/0154366 A1 | 6/2017 | Turgeman |
| 2017/0193526 A1 | 7/2017 | Turgeman |
| 2017/0195354 A1 | 7/2017 | Kesin |
| 2017/0195356 A1 | 7/2017 | Turgeman |
| 2017/0221064 A1 | 8/2017 | Turgeman |
| 2017/0302340 A1 | 10/2017 | Berlin |
| 2017/0364919 A1 | 12/2017 | Ranganath |
| 2018/0012227 A1 | 1/2018 | Tunnell |
| 2018/0034850 A1 | 2/2018 | Turgeman |
| 2018/0095596 A1 | 4/2018 | Turgeman |
| 2018/0103047 A1 | 4/2018 | Turgeman |
| 2018/0107836 A1 | 4/2018 | Boger |
| 2018/0115899 A1 | 4/2018 | Kedem |
| 2018/0121640 A1 | 5/2018 | Turgeman |
| 2018/0160309 A1 | 6/2018 | Turgeman |
| 2018/0314816 A1 | 11/2018 | Turgeman |
| 2018/0349583 A1 | 12/2018 | Turgeman |
| 2018/0350144 A1 | 12/2018 | Rathod |
| 2018/0351959 A1 | 12/2018 | Turgeman |
| 2019/0028497 A1 | 1/2019 | Karabchevsky |
| 2019/0057200 A1 | 2/2019 | Sabag |
| 2019/0121956 A1 | 4/2019 | Turgeman |
| 2019/0156034 A1 | 5/2019 | Kedem |
| 2019/0158535 A1 | 5/2019 | Kedem |
| 2019/0220863 A1 | 7/2019 | Novick |

FOREIGN PATENT DOCUMENTS

| | | |
|---|---|---|
| EP | 2477136 | 7/2012 |
| EP | 2477136 A1 | 7/2012 |
| EP | 2610776 | 7/2013 |
| EP | 2610776 A2 | 7/2013 |
| EP | 2646904 B1 | 8/2018 |
| EP | 3019991 B1 | 2/2019 |
| ES | 2338092 | 5/2010 |
| ES | 2338092 A1 | 5/2010 |
| WO | 2005009166 A2 | 10/2005 |
| WO | 2005099166 | 10/2005 |
| WO | 2007146437 | 12/2007 |
| WO | 2007146437 A2 | 12/2007 |
| WO | 2012073233 | 6/2012 |
| WO | 2012073233 A1 | 6/2012 |

OTHER PUBLICATIONS

Written Opinion of the International Searching Authority for PCT international application PCT/IL2018/051246, dated Mar. 11, 2019.
Written Opinion of the International Searching Authority for PCT international application PCT/IL2011/000907, dated Apr. 19, 2012.
Written Opinion of the International Searching Authority for PCT international application PCT/IB2014/062293, dated Oct. 1, 2014.
Written Opinion of the International Searching Authority for PCT international application PCT/IB2014/062941, dated Dec. 17, 2014.
Written Opinion of the International Searching Authority for PCT international application PCT/IB2016/054064, dated Jul. 9, 2015.
Syed Ahsan Abbas et al., "What is the difference between a rooted and unrooted Android?" Quora.com, dated Jul. 22, 2016, printed on Aug. 12, 2019 from: www.Quora.com/What-is-the-difference-between-a-rooted-and-unrooted-Android.
Sebastian Lindstrom, "Getting to know asynchronous JavaScript: Callbacks, Promises and Async / Await", Medium.com, dated Jul. 2, 2017, printed on Aug. 12, 2019 from: Medium.com/codebuddies/getting-to-know-asynchronous-javascript-callbacks-promises-and-async-await-17e0673281ee.
Ahmed et al., "A New Biometric Technology Based on Mouse Dynamics", Jul.-Sep. 2007, IEEE Transactions on Dependable and Secure Computing, vol. 4, No. 3, pp. 165-179.
Bailey, Kyle O., "Computer Based Behavioral Biometric Authentication Via Multi-Modal Fusion", Thesis, 2013, Air Force Insitute of Technology.
Elizabeth Stinson and John C. Mitchell, "Characterizing the Remote Control Behavior of Bots", Detection of Intrusions and Malware, and Vulnerability Assessment. Springer Benin Heidelberg, p. 89-108. Dec. 31, 2007.
Todorov, "Optimality Principles in Sensorimotor Control (Review)", Sep. 2004, Nature Neuroscience 7, pp. 907-915.
Cleeff et al., "Security Implications of Virtualization: A Literature Study", Science and Engineering, 2009.
Hibbeln et al., "Detecting Deception in Online Environments: Measuring Fraud Through Mouse Cursor Movements", Jun. 7, 2014, Gmunden Retreat on NeuroIS 2014 Gmunden Austria, p. 38.
Ferrie Peter, "Attack on Virtual Machine Emulators", Symantec Technology Exchange, 2007.
Yampolskiy et al., "Behavioural Biometrics: a survey and classification", 2008, International Journal of Biometrics, vol. 1, No. 1, pp. 81-113.
Provos et al., 2007, "The Ghost in the Browser: Analysis of Web-based Malware".
Huang Yao-Wen et al., "Web application security assessment by fault injection and behavior monitoring", 2003, Proceedings of the 12th international conference on World Wide Web, ACM.
Ben Hansen, "The Blur Busters Mouse Guide", dated Feb. 1, 2014; printed from the Internet on Aug. 5, 2019 from: https://www.blurbusters.com/faq/mouse-guide/.
Chris Cain, "Analyzing Man-in-the-Browser (MITB) Attacks", dated Dec. 2014; downloaded from the Internet on Aug. 5, 2019 from: https://www.sans.org/reading-room/whitepapers/forensics/analyzing-man-in-the-browser-mitb-attacks-35687.
Stinson et al., "Characterizing Bots' Remote Control Behavior". Detection of Intrusions and Malware, and Vulnerability Assessment. Springer Berlin Heidelberg, p. 89-108. Dec. 31, 2007.
Emmanouil Vasilomanolakis, "A honeypot-driven cyber incident monitor: Lessons learned and steps ahead"; Sep. 2015; SIN '15: Proceedings of the 8th International Conference on Security of Information and Networks; Publisher: ACM; pp. 1-7.
Franklin et al., "Remote Detection of Virtual Machine Monitors with Fuzzy benchmarking", ACM SIGOPS Operating Systems Review, V42, Issue 3, Apr. 2008.
Georgia Frantzeskou et al., "Identifying Authorship by Byte-Level N-Grams: The source Code Author Profile (SCAP) Method", Spring 2007, International Journal of Digital Evidence, vol. 6, issue 1.
Liston et al., "On the Cutting Edge: Thwarting Virtual Machine Detection"; retrieved from the Internet on May 3, 2017, from: http://docplayer.net/9791309-On-the-cutting-edge-thwarting-virtual-machine-detection.html.
Zheng et al., "An Efficient User Verification System via Mouse Movements", Oct. 17-21, 2011, CCS' 11, Chicago, Illinois.
Tavis Ormandy, "An Empirical Study into the Security Exposure to Hosts of Hostile Virtualized Environments", retrieved from the Internet on May 3, 2017, from: http://taviso.decsystem.org/virtsec.pdf.
Spafford et al., "Software Forensics: Can We Track Code to its Authors48 ", Feb. 1992, Computer Science Technical Report, Purdue e-Pubs, Report No. CSD-TR-92-010.

(56) References Cited

OTHER PUBLICATIONS

Garfinkel and Rosenblum, "A virtual Machine Introspection-Based Architecture for Intrusion Detection", 2003, Proc. Network and Distributed Systems Security Symp., The Internet Society, pp. 191-206.

Nance et al., "Virtual Machine Introspection", IEEE Security & Privacy, 2008.

Nakkabi et al., "Improving Mouse Dynamics Biometric Performance Using Variance Reduction via Extractors with Separate Features", Nov. 2010, IEEE Transactions on System, Man, and Cybernetics; vol. 40, No. 6.

International Search Report for application PCT/IL2011/000907 dated Apr. 19, 2012.

International Search Report for application PCT/IB2014/062293 dated Oct. 1, 2014.

International Search Report for application PCT/IB2014/062941 dated Dec. 17, 2014.

International Search Report for application PCT/IB2016/054064 dated Nov. 21, 2016.

Supplementary European Search Report for application 11844440 dated Nov. 17, 2017.

Faisal Alkhateeb et al., "Bank Web Sites Phishing Detection and Notification System Based on Semantic Web technologies", International Journal of Security and its Applications 6(4):53-66, Oct. 2012.

Sungzoon Cho et al., "Artificial Rhythms and Cues for Keystroke Dynamics Based Authentication", International Conference on Biometrics (ICB)—Advances in Biometrics, pp. 626-632, year 2006.

International Search Report for PCT/IB2017/055995, dated Feb. 15, 2018.

Written Opinion of the International Search Authority for PCT/IB2017/055995, dated Feb. 15, 2018.

Spafford et al., "Software Forensics: Can We Track Code to its Authors?", Feb. 1992, Computer Science Technical Report, Purdue e-Pubs, Report No. CSD-TR-92-010.

\* cited by examiner

SYSTEM, DEVICE, AND METHOD FOR DETECTING A PROXY SERVER

CROSS-REFERENCE TO RELATED APPLICATIONS

This application is a Continuation of U.S. patent application Ser. No. 15/203,817, filed on Jul. 7, 2016, which is hereby incorporated by reference in its entirety; which claimed priority and benefit from U.S. provisional patent application Ser. No. 62/190,264, filed on Jul. 9, 2015, which is hereby incorporated by reference in its entirety.

FIELD

The present invention is related to the field of security of electronic devices and systems.

BACKGROUND

Millions of people utilize mobile and non-mobile electronic devices, such as smartphones, tablets, laptop computers and desktop computers, in order to perform various activities. Such activities may include, for example, browsing the Internet, sending and receiving electronic mail (email) messages, taking photographs and videos, engaging in a video conference or a chat session, playing games, or the like.

Some activities may be privileged, or may require authentication of the user in order to ensure that only an authorized user engages in the activity. For example, a user may be required to enter a username and a password in order to access an email account, or in order to access an online banking interface or website.

SUMMARY

The present invention may include devices, systems, and methods of detecting whether a user or an electronic device or computer, is accessing (or is attempting to access) a remote server or a remote computerized service, either: (I) directly, or (II) indirectly through a proxy server.

The present invention may further determine that a user or an electronic device, that is estimated to be accessing the remote service via a proxy server, is more-probably or is most-probably a cyber-attacker and not a legitimate user; based on the utilization of proxy server, by itself and/or in combination with other conditions or other analysis; and optionally by taking into account user-specific characteristics that may be extracted from user-gestures and other user interactions that are performed by the user via input-unit(s) of the electronic device; and further, optionally, by injecting or introducing an input-output aberration or interference or irregularity which may require a human user to perform certain manual corrective actions.

Devices, systems, and methods of detecting whether an electronic device or computerized device or computer, is communicating with a computerized service or a trusted server directly and without an intermediary web-proxy, or indirectly by utilizing a proxy server or web-proxy. The system searches for particular characteristics or attributes, that characterize a proxy-based communication session or channel and that do not characterize a direct non-proxy-based communication session or channel; or conversely, the system searches for particular characteristics or attributes, that characterize a direct non-proxy-based communication session or channel and that do not characterize a proxy-based communication session or channel; and based on these characteristics, determines whether or not a proxy server exists and operates.

The present invention may provide other and/or additional benefits or advantages.

DETAILED DESCRIPTION OF THE PRESENT INVENTION

Figure 1:
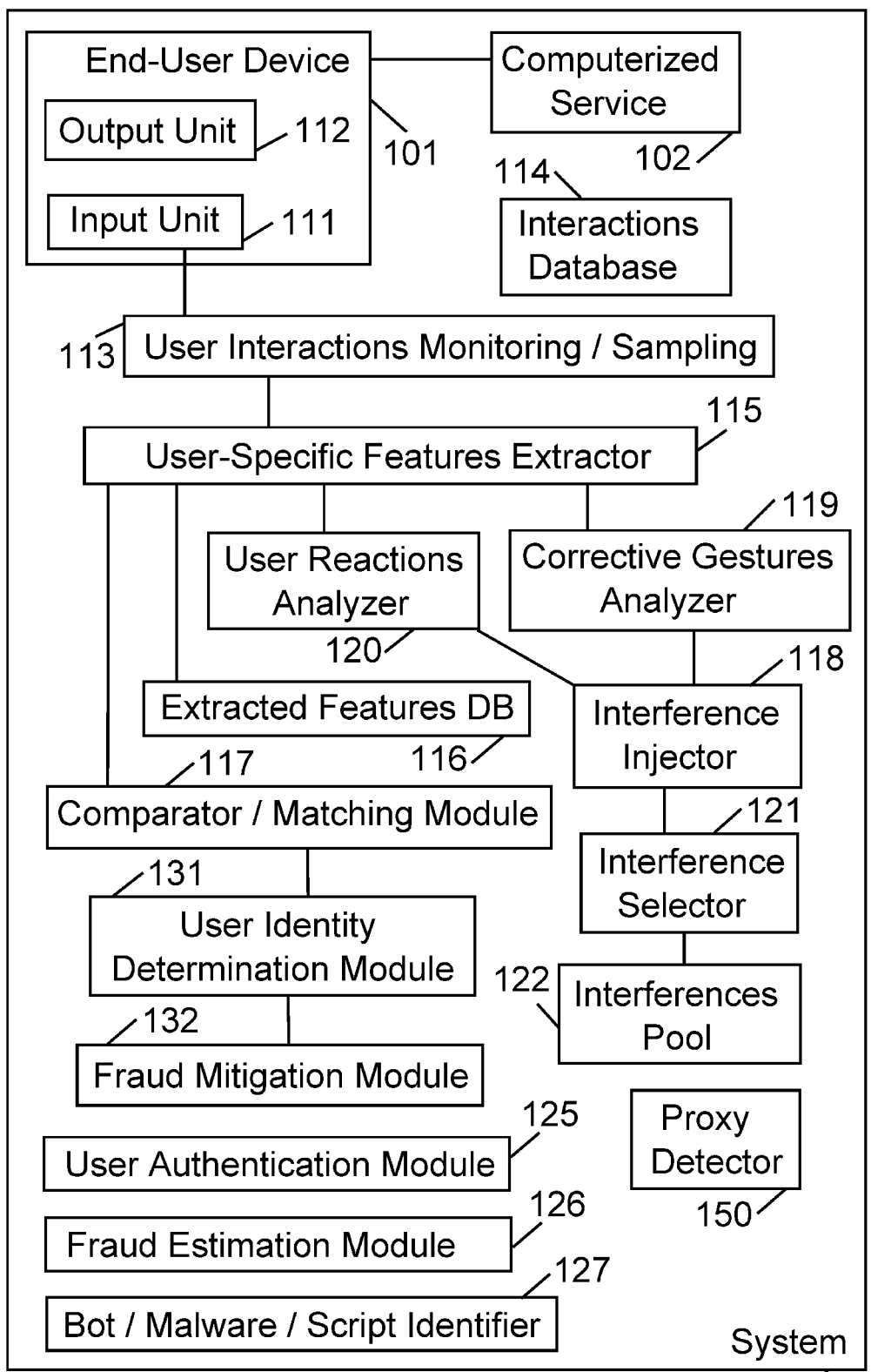
FIG. 1 is a schematic block-diagram illustration of a system, in accordance with some demonstrative embodiments of the present invention.

The present invention comprises devices, systems, and methods of detecting whether a user or an electronic device or computer, is accessing (or is attempting to access) a remote server or a remote computerized service, either: (I) directly, or (II) indirectly through a proxy server.

The Applicants have realized that some cyber-attackers and other illegitimate users of a computerized service, may access a remote server indirectly, by utilizing a Proxy Server or other similar interim node or relay-node or relay-point, or by using a Virtual Private Network (VPN), or by using a tunneling server or tunneling mechanism, or other interim mechanism.

The Applicants have realized that it may be beneficial to detect or to determine, or to estimate, that a user and/or an electronic device is accessing (or, is attempting to access) a remote server or a computerized service, indirectly via a Proxy Server, rather than directly; and that such detection or estimation may be taken into account when determining or estimating whether the user is a legitimate human user, or is an illegitimate cyber-attacker or "fraudster".

The term "Proxy Server" as used herein may comprise, for example, any suitable (e.g., hardware-based and/or software-based) node or computer or server or network element (e.g., router, switch, hub, gateway, relay unit, repeater, forwarding unit, tunneling unit, encapsulator, encapsulating unit, or the like), which is able to act as an intermediary for requests from clients (e.g., end-user devices) seeking responses from a server. For example, the end-user device may request a file, a connection, a web-page, a web-hosted content-item, a data-item accessible over TCP/IP, a response to a query, or the like; but instead of submitting or sending the request directly from the end-user device to the destination server that is able to respond or to serve the requested resource or content, the end-user device may send the request to the proxy server. Then, the proxy server may forward the request to the destination server, optionally after modifying some portions of the request, and optionally such that the destination server does not know the identity (e.g., the Internet Protocol (IP) address, the User Agent string, and/or other identifying data-items) of the end-user device. Then, the destination server responds to the request, by sending to the proxy server the requested information or resource (e.g., response to the query; file; data-item; content hosted on web-server). Then, the proxy server forwards or transmits the received response, to the end-user device, which may consume it, display it (e.g., via a web browser), store it, and/or otherwise process it or utilize it.

Some embodiments of the present invention may detect a proxy server, or a malicious proxy server or a fraud-related proxy server, or a proxy server that is known to the end-user, or a proxy server or proxy mechanism that is unknown to the end-user (e.g., if a local malware module is installed on the end-user device and tunnels traffic through a malicious proxy server), or a proxy mechanism that is utilized or that may be utilized for fraudulent activity or for unauthorized access to a computerized service or for illegitimate access or for illegitimate online actions. Some demonstrative embodiments of the present invention may utilize any suitable combination(s) of one or more of the following implementations and/or examples.

Reference is made to FIG. 1, which is a schematic block-diagram illustration of a system 100 in accordance with some demonstrative embodiments of the present invention. The components of system 100 may be implemented by using suitable hardware units and/or software units; and may be co-located within a single computer device or a single computing system, or may be scattered or distributed across two or more computing devices and/or computing systems. In some embodiments, client-server architecture may be used; such that some of the components and units may be implemented locally at the end-user device, whereas other components and units may be implemented remotely or by using a remote server or a "cloud computing" server or repository or computer. In some embodiments, some modules and functionality may be implemented by utilizing a web-browser, a plug-in or extension or add-on to a web-browser or to an Operating System (OS), by using a native application or a mobile-web application, by using JavaScript and/or CSS and/or HTML5, and/or by using other suitable technologies. Components of system 100 may interact or communicate over one or more wireless communication links, wired communication links, cellular communication, client/server communication, peer-to-peer communication, or the like.

System 100 may enable an end-user device 101 to interact with a computerized service 102. The end-user device 101 may be, for example, a smartphone, a tablet, a laptop computer, a fitness bracelet (e.g., similar to FitBit or Jaw-Bone wearable devices), a wearable device, a portable device, an Augmented Reality (AR) device or glasses or helmet or headgear (e.g., similar to Google Glass), a Virtual Reality (VR) device or glasses or helmet or headgear (e.g., similar to Oculus Rift), or the like. In some embodiments, the end-use device 101 may be a stand-alone machine or interface; a digital kiosk or kiosk-type machine, a vending machine, an Automated Teller Machine (ATM), a point-of-sale (POS) terminal or machine, or the like. In some embodiments, the end-user device 101 may be a point-of-entry terminal, or a user-identification terminal, such as a terminal or scanner or dashboard or touch-screen which may be used for secure physical entry or entrance or passage through a gate or door or lobby or turnstiles or room or corridor, or as part of (or replacement of) a physical entry monitoring system. In yet other embodiments, the end-user device 101 may be or may comprise, or may be comprised in, a vehicle, a vehicular device, a dashboard, a vehicular dashboard, a vehicular computing system, a vehicular computing device, a vehicular ignition unit or system, a vehicular component that is operable in conjunction with a vehicular ignition system, a vehicular immobilizer unit, a vehicular component that is operable in conjunction with a vehicular immobilizer unit, or the like.

The computerized service 102 may be a local and/or a remote computerized platform or service or application or web-site or web-page. The computerized service may be installed locally and entirely on the end-user device 101; or may be installed remotely and entirely on a remote server or a remote computer which is then accessed by the end-user device 101 either via one or more wired and/or wireless communication link(s); or may be a hybrid implementation which utilizes one or more remote components (e.g., a remote Application Server) and one or more local components (e.g., a local native application; a local mobile-web application; a local web-browser).

Some demonstrative and non-limiting examples, of suitable computerizes service(s) which may be used in conjunction with the present invention, may include: banking service, online banking services, retail banking services (e.g., performed within or at an ATM or a branch of a bank); brokerage or online brokerage services; usage and/or access to electronic mail, email, SMS accounts, instant messaging (IM) accounts and services, social networks; an enterprise network or corporate network or organizational network which is available only to employees or authorized users of an organization or enterprise; a members-only network or service, or a paying-members-only service or network, or a premium service, which are available only to certain users and/or to members and/or to paying users; applications and/or websites and/or services that enable or perform payment, electronic payment, utilization of credit card and/or debit card and/or wire transfer and/or electronic funds transfer; applications that access or utilize a secure database storing confidential or non-public information; and/or any suitable electronic service which may be accessed locally and/or remotely by end-user device 101.

In some embodiments, the computerized service 102 need not be external to the end-user device 101, and may be entirely internal to the end-user device 101, or may be the end-user device 101, or may be a particular functionality or a general functionality of the end-user device 101. For example, the end-user device may be a smartphone or tablet; and the computerized service 102 may be one or more features or functionalities or applications of that smartphone or tablets. In some embodiments, the present invention may be used as part of a locking or unlocking mechanism of a smartphone or tablet or other end-user device 101; or as part of a process in which a user unlocks or "wakes up" a hibernating device, or takes the device from reduced-power mode (or from "sleep mode") to fully-operational mode.

End-user device comprises an input unit 111, for example, mouse, keyboard, stylus, touch-screen, multi-touch-screen, trackball, joystick, or the like. End-user device further comprises an output unit 112, for example, monitor, screen, touch-screen, multi-touch-screen, or the like. In some embodiments, the input unit and the output unit may be implemented as the same single unit, for example, as a touch-screen or multi-touch screen.

A user interactions monitoring/sampling module 113 may monitor some or all of the user interactions and/or user gestures; and may record, capture, or otherwise sample such interactions and/or gestures. Optionally, an interactions database 114 may log and/or may store data reflecting the monitored user interactions, for a single user or for multiple users.

User-specific features extractor 115 may extract or estimate user-specific features or traits or characteristics or attributes, that characterize an interaction (or a set or batch or group or flow of interactions, or a session of interactions) of a user with the computerized service 102. Optionally, an extracted features database 116 may store data or records which reflects users and their respective values of extracted (or estimated) user-specific features.

Optionally, a comparator/matching module 117 may compare or match, between (or among): (a) values of user-specific features that are extracted in a current user session (or user interaction), and (b) values of respective previously-captured or previously-extracted user-specific features (of the current user, and/or of other users, and/or of pre-defined sets of values that correspond to known automated scripts or "bots" or known attackers).

The user-specific features, whose values may be compared or matched across usage-sessions, may include, for example, curvature (or curvature radius) of mouse movement or mouse strokes; acceleration and/or speed of mouse movement in one or more directions; smoothness of movement; velocity or speed of gestures; acceleration or deceleration of gestures; rate or frequency of mouse clicks; accuracy or inaccuracy of gestures or clicks, or their relative location (e.g., whether the user typically clicks correctly an on-screen button, or sometimes misses the button and clicks nearby); the particular type of manner that the user chose to convey input (e.g., whether the user clicked on "submit" button, or pressed the "enter" key; or, whether the use moved between form fields by using the "tab" key or by using the mouse cursor); particular sequences of keys or characters that the user enters more rapidly (or more slowly) relative to other characters or sequences; particular manner or pattern in which the user navigates within fields or within a page or an application; and/or other suitable features, for example: device movements or input-unit movement during interaction, movement and/or orientation and/or acceleration of the entire device (e.g., a smartphone or tablet) during the interaction, whether one single finger or multiple particular fingers are used for interacting, the relations between fingers while interacting, the relation to other body parts while interacting, and/or other suitable gesture parameters. Optionally a deep learning algorithm and/or a machine learning algorithm or other suitable Artificial Intelligence (A.I.) algorithm may be utilized, in order to learn and to define a user-specific profile based on the data that is monitored or produced during the interaction (and optionally, immediately prior to the interaction and/or immediately after the interaction); optionally, without necessarily using any specific pre-define features or characteristics or features, and optionally using a heuristic approach or holistic approach or "fuzzy logic" algorithm that attempts to find a unique identifier or a unique digital footprint without necessarily being tied to a specific biometric parameter or to a set of pre-defined biometric parameters. Some embodiments may thus generate a user-specific biometric profile or biometric signature, without pre-defining a set of biometric characteristics or parameters that are then used to calculate the signature or profile; but rather, by utilizing deep learning which utilizes mathematical generation of a unique profile or signature without necessarily defining or pre-defining the set of physical parameters that would be used for differentiating among users.

Optionally, an interference injector 118 may operate to introduce, add, inject, generate and/or otherwise cause an interference (or anomaly, or aberration, or inconsistency, or deviation, or input-output interference, or input/output anomaly) to the input and/or the output as they are reflected to the user who utilizes the end-user device. Such intentionally-introduced input/output interference may be, for example: temporarily hiding or removing the on-screen mouse-pointer or on-screen pointer, in order to elicit the user to react and to make gestures in an attempt to revive the hidden on-screen pointer; intentional deviations or "jumps" in the movement of the on-screen pointer, relative to the actual manual gesture that is performed by the human user (e.g., the human user drags the mouse eastbound, but the on-screen pointer deviates and moves north-east, thereby eliciting a corrective movement or corrective gestures by the user); intentionally moving or re-locating an on-screen interface component (e.g., a "submit" button or a "next" button) while the user is dragging an on-screen pointer; and/or other suitable interferences or anomalies, whose goal is to elicit the user to react and/or to perform corrective steps or corrective gestures; thereby enabling the user-specific features extractor 115 to further extract user-specific attributes or features that characterizes such corrective gestures or such reactions to anomalies; e.g., the time period that it takes the user to notice the anomaly and/or to correct it; the manner in which the user corrects the anomaly (e.g., whether the user tries to locate a disappeared on-screen pointer, by shaking his mouse, or by moving the mouse sideways, or by moving the mouse clockwise, or by moving the mouse counter-clockwise, or by clicking the mouse-button once, or by clicking the mouse-button multiple times, or by typing on the keyboard.

In some embodiments, a corrective gestures analyzer unit 119 may monitor, track, analyze and/or characterize such corrective actions or gestures of the user in response to such interference or anomaly or aberration. In some embodiments, a user reaction analyzer unit 120 may monitor, track, analyze and/or characterize such gestures or reactions of the user in response to such interference (which may not necessarily involve a corrective action). In some embodiments, these functionalities, of the corrective gestures analyzer unit 119 and/or the user reaction analyzer unit 120 may be part of the functionality of the user-specific features extractor 115.

It is noted that in some embodiments, interferences may be injected or used continuously; or may be used only in particular portions or regions of the computerized service (e.g., only on certain pages of a website, or only when certain functionalities of the application are requested, such as high-risk or higher-risk functions); or may be injected pseudo-randomly, or at pre-defined time intervals; or may be injected if one or more other conditions are true (e.g., if there are other indicators of fraudulent activity or irregular activity); or may not be injected at all, for a particular user or for a particular usage-session, or for all users or for a group of users. In some embodiments, optionally, an interference selector module 121 may select or may determine, based on one or more criteria or conditions, whether or not to introduce an interference, or whether (or when exactly, or where exactly) to trigger or to command the interference generator 118 to generate an interference; optionally by selecting a suitable interference from a pre-defined interferences pool 122. For example, the interference selection may be based on user characteristics, and/or based on attributes of the computerized service, and/or based on pseudo-random selection; or by selecting interferences of a type that was not yet used for a particular user, or conversely by selecting interferences of a type that had been already used for a particular user, or by taking into account the level of risk associated with a user-requested functionality of the computerizes service, or the like. The injection of interferences, and/or the analysis of user reactions to interference, and/or the analysis of corrective gestures, may be optional.

If the comparator/matching module 117 determines that one or more features, or a set of features, that characterize the current interaction session of the current user, does not match those features as extracted in previous interaction session(s) of that user, then, a possible-fraud signal may be generated or sent or transmitted to other units of system 100 and/or to pre-defined recipients.

For example, combined factors and data may be taken into account by a user identity determination module 131, which may determine or estimate whether or not the current user is a "fraudster" or an attacker or an imposter. The user identity determination module 131 may trigger or activate a fraud mitigation module 132 able to perform one or more fraud mitigating steps based on that determination or estimation; for example, by requiring the current user to respond to a challenge, to answer security question(s), to contact customer service by phone, to perform two-step authentication or two-factor authentication, or the like.

System 100 may comprise a user authentication module 125 which may enable system 100 and/or computerized service 102 and/or end-user device 101 to perform user authentication, or to authenticate or verify or confirm the identity of a user of end-user device 101 (or of computerized service 102), and/or to utilize the unique behavior and/or gestures and/or reactions of the user as a user-identifying feature (e.g., which may be used by the system to authorize a log-in, or may authorize access, or may authorize a password recovery or a password reset process). The user authentication module 125 may be able to distinguish between (i) a legitimate user, or genuine user, or authorized user, or genuine account-owner; and (ii) an illegitimate user or attacker or cyber-attacker or impostor or imposter, a human attacker, a non-human attacker (e.g., a malware or automatic script or automated script or "bot") or other illegitimate user.

In some embodiments, system 100 may comprise a fraud estimation module 126, able to estimate or detect or determine a fraud or a fraudulent transaction or a fraudulent user or an attacker or a fraudulent set-of-operations, or an attempted fraud or an attempted fraudulent transaction (which may be concurrently occurring, or which had already occurred and is now detected or estimated in retrospective review of previous operations or prior data).

System 100 may further comprise a Bot/Malware/Script Identifier 127, able to estimate or detect or determine that an electronic device or computer, or computing device, or a computerized service, is being controlled (or, is being attempted to be controlled, or attacked, or accessed, or utilized) by a "Bot" or malware or automated script or other automatic cyber-attack unit or module, rather than by a legitimate human user (or, rather than by a human user).

System 100 may further comprise a Proxy Detector 150, able to detect or determine or estimate, that a proxy server or other intermediary device or intermediary network-element is utilized by the end-user (intentionally, or even unknowingly) for accessing a remote server or a computerized service; or able to detect or estimate that a user or an end-user device is accessing (or is attempting to access) a server or a remote server, through a proxy server or through other intermediary network element or relay element.

System 100 may further comprise one or more of the other modules, units and/or components that are described herein.

Figure 2A:
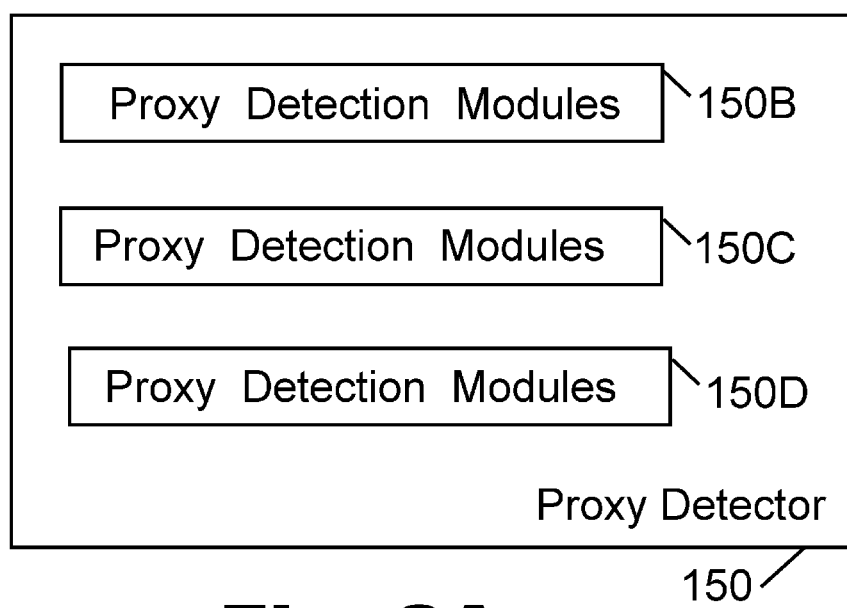
FIGS. 2A-2D are schematic block-diagram illustrations of a proxy detector and its components, in accordance with some demonstrative embodiments of the present invention.
Figure 2B:
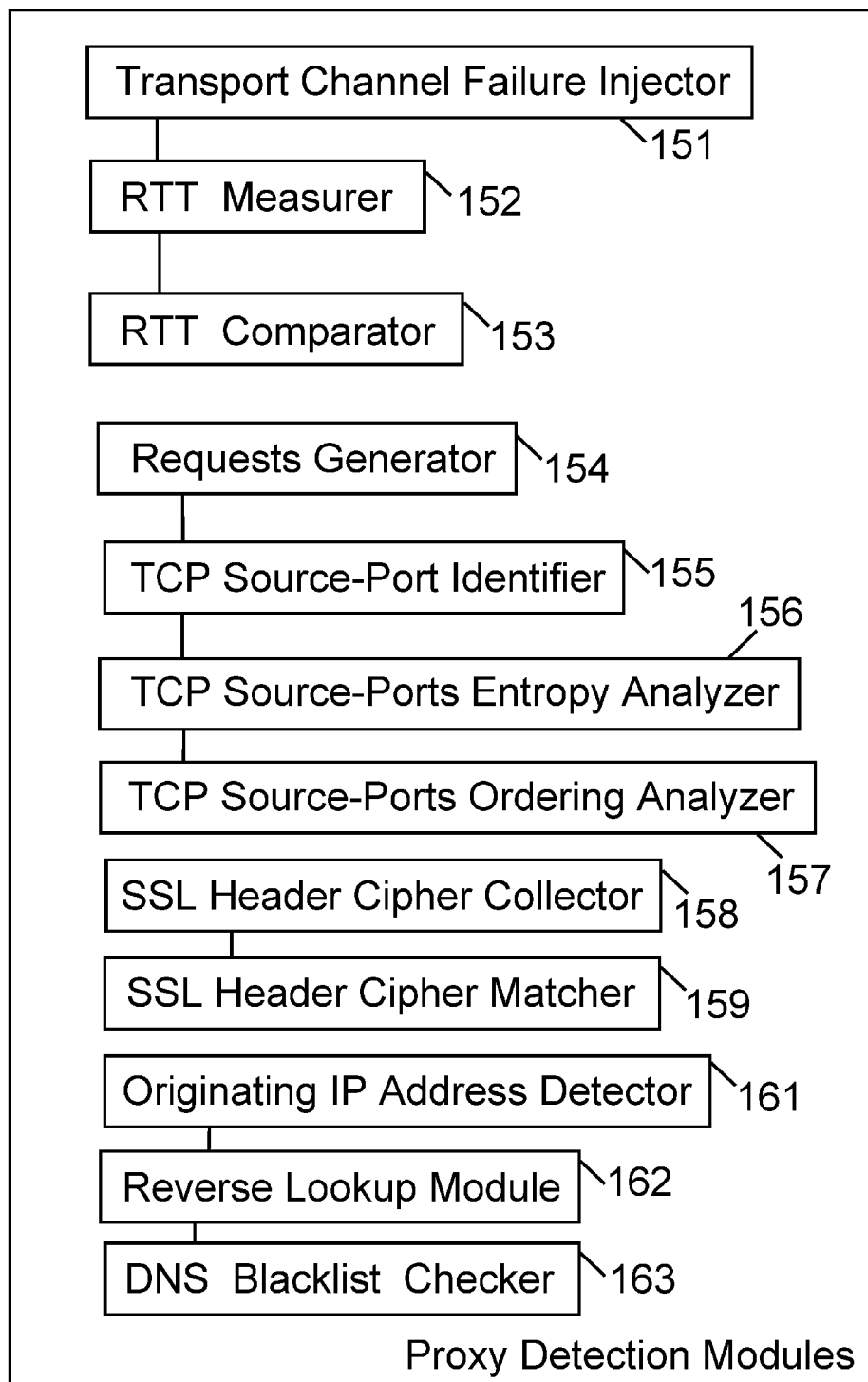
Figure 2C:
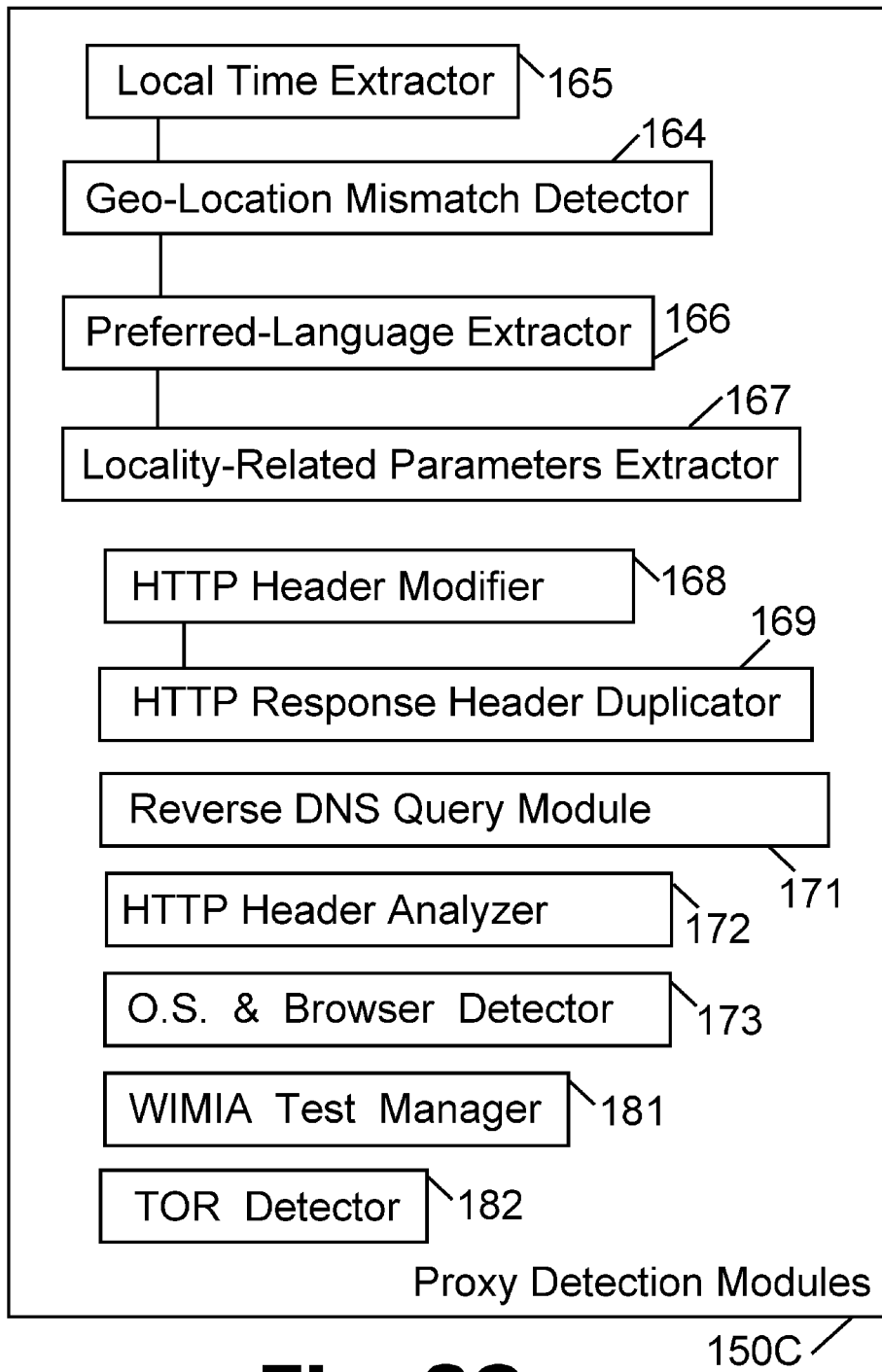
Figure 2D:
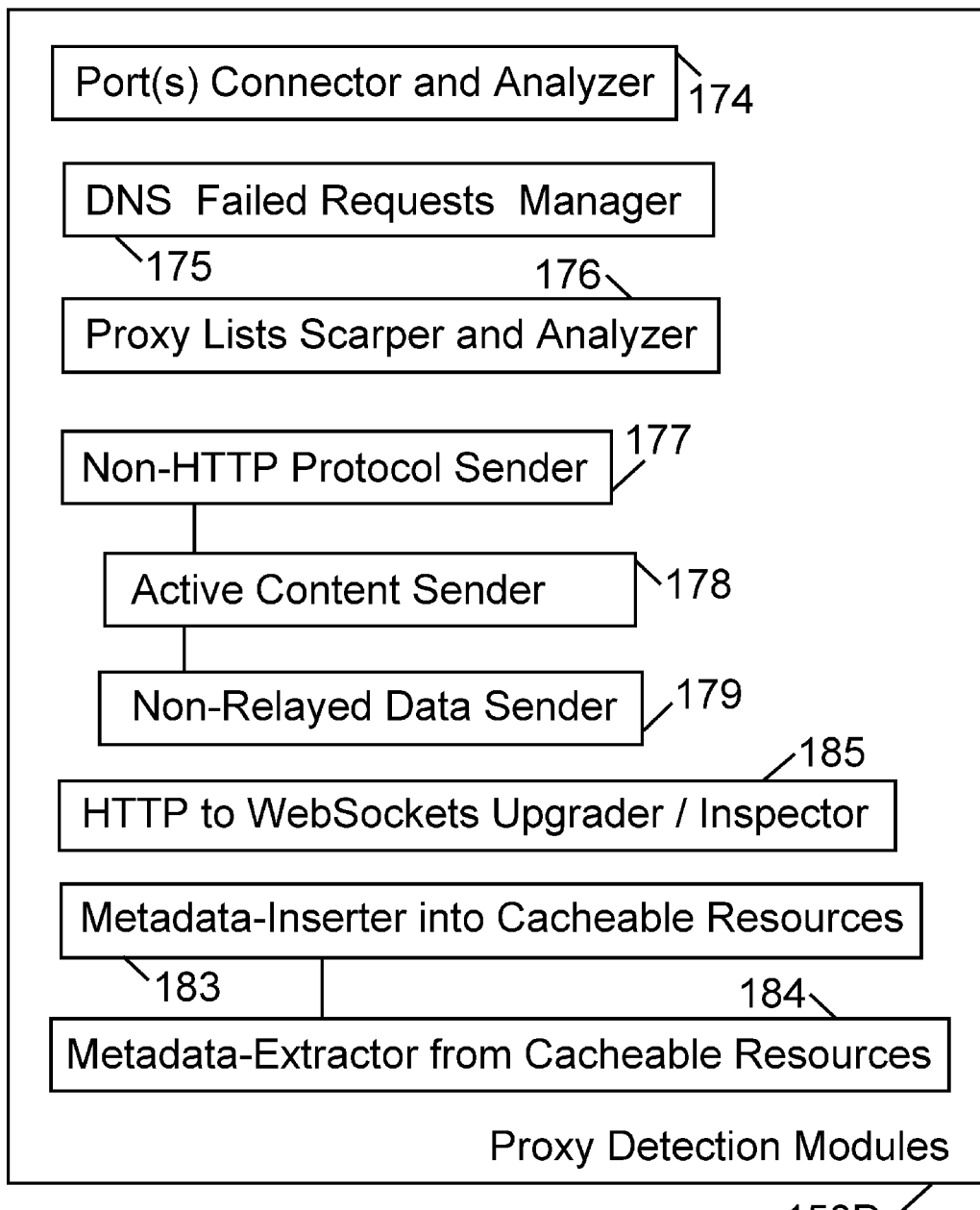

Reference is made to FIG. 2A, which is a schematic block-diagram illustration of Proxy Detector 150 and its associated components, in accordance with some demonstrative embodiments of the present invention. In order not to over-crowed the drawings, the components and/or units and/or modules which may be comprised in Proxy Detector 150, have been divided into several groups of components: Proxy Detection Modules 150B of FIG. 2B; Proxy Detection Modules 150C of FIG. 2C; and Proxy Detection Modules 150D of FIG. 2D. It is clarified that some or all of the modules or units that are shown in FIG. 2B and/or FIGS. 2C and/or FIG. 2D, may be implemented together and may be co-located with the same proxy server detector 150. Furthermore, proxy detector 150 may be configured such that a proxy detection or proxy estimation may be based on two or more aggregate conditions or alternate conditions, or two or more aggregate outputs or alternate outputs of the various units of FIG. 2B and/or FIGS. 2C and/or FIG. 2D. Accordingly, all the modules and units that appear in FIG. 2B and/or FIGS. 2C and/or FIG. 2D may be regarded as optionally being comprised in the same proxy detector, and as being able to interact with each other, and being able to transfer their output or their detection results to the proxy detector 150 which may take into account one or on more, or two or more, or some, detection results in the aggregate or in the alternate, or may use a weighted formula or a lookup table to assign different weights to the detection results of each such participating module in order to reach a weighted determination regarding existence of a proxy server.

A first set of demonstrative embodiments may detect a proxy server by utilizing application layer challenges, and/or by resource timing utilizing synthesized channel failures. This may include synthesizing failures (e.g., NACK, RST) in the transport channel, that would cause the proxy server to respond with retransmissions, channel-closing, or other operations, allowing the system to measure round-trip times (RTTs) between the system's servers and the (suspected) proxy. At the same time, or in parallel, or simultaneously, making a simple request from the client device to a non-cached resource, may be used to measure RTT between the client device and the system's servers. Measuring these and additional channel timings may enable to reach a determination of probable proxy usage.

For example, a Transport Channel Failure Injector 151 may generate, introduce, insert, add and/or inject a failure, such as a Negative Acknowledgement (NACK) and/or a Reset flag or Reset packet (RST), into a data-stream (e.g., into a TCP/IP stream of packets). In response to such injected failures, the intermediate proxy server may generate a retransmission request, may perform channel closing, or may perform other operations which may indicate that a proxy server exists and operates as intermediary. An RTT Measurer 152 may measure the RTT between (i) a trusted server (e.g., owned or controlled by a trusted party, such as by the owner or administrator of system 100), and (ii) the suspected proxy server. Meanwhile, the end-user device may be triggered to request a non-cached resource or non-cached data-item directly from the trusted server, and the RTT Measurer 152 may measure the RTT between (i) the trusted server, and (ii) the end-user device.

Then, an RTT Comparator 153 may compare between: (I) the first RTT value (between the trusted server and a suspected proxy server), and (II) the second RTT value (between the trusted server and a the end-user device). If the two RTT values are identical, or are sufficiently close to each other (e.g., the first RTT is in a range of 0.80 to 1.20 times the second RTT), then more-probably a proxy server does not exist or does not operate between the end-user device and the trusted server. Conversely, if the RTT values are different (or, are apart) by at least a pre-defined difference (e.g., if the first RTT value is at least 1.20 greater than the second RTT value; or, if the first RTT value is at most 0.80 of the second RTT value), then more-probably a proxy server exists and operates between the end-user device and the trusted server. The threshold values of 0.80 and 1.20 are only non-limiting examples, and other suitable threshold values, ranges, ratios, comparison conditions, or matching conditions, may be used.

A second set of embodiments may utilize TCP source port entropy, in order to detect a proxy server. For example, a Requests Generator 154 may generate or may issue a batch of small or very-small requests (e.g., each request having a small size, smaller than a pre-defined threshold value; for example, smaller than 512 bytes, or smaller than 256 bytes). Then, a TCP source-port identifier 155 may detect or identify the TCP source-port for each such request; and a Distribution Analyzer may sample and/or analyzer the distribution of the TCP source-ports. Particularly, a TCP source-ports entropy analyzer 156 may analyze the entropy of the distribution of source-port (e.g., such that entropy that is greater than a pre-defined threshold, indicates a proxy server; or such that entropy that is smaller than a pre-defined threshold, indicates a proxy server), or may compare the entropy to pre-known values and/or to expected values, in order to determine that a proxy server exists and operates.

Additionally or alternatively, a TCP source-ports ordering analyzer 157 may analyze the ordering of the distribution of source-port (e.g., such that a detected ordering which matches a particular pre-defined pattern or sequence, indicates a proxy server), or may compare the ordering to pre-known values and/or to expected values, in order to determine that a proxy server exists and operates.

A third set of embodiments may utilize Secure Socket Layer (SSL) header ciphers (e.g., supported and/or suggested SSL header ciphers), and/or their order of appearance, as indication(s) for presence of a proxy server or for detection of a proxy server. For example, each browser or client application may utilize a different SSL header cipher; and an SSL Header Cipher Collector 158 may track or log or collect the SSL header cipher, or the various multiple SSL header ciphers, that are used in conjunction with a particular end-user device. Then, an SSL Header Cipher Matcher 159 may check whether there is a discrepancy or mismatch between: (I) the actually-collected SSL header ciphers, and (II) the SSL header cipher(s) that are declared by a given browser (or application) of the end-user device. Such discrepancy or mismatch in the SSL header cipher(s), may lead the system to determine that a proxy server exists and operates, and/or that (illegitimate) spoofing of data is performed (e.g., by the end-user device, or by a network element on behalf of the end-user device).

A fourth set of embodiments may check Domain Name Server (DNS) blacklist(s) (DNSBL) data, in order to detect or estimate that a proxy server is utilized. For example, an Originating IP Address Detector 161 may detect the originating IP address; a Reverse Lookup module 162 may perform reverse lookup of the originating IP address to a corresponding domain name (or, other methods may be used to convert the originating IP address to an originating domain name); then, a DNS BlackList Checker 163 may check whether the originating IP address and/or the originating domain name, appear on one or more DNS blacklist(s) (e.g., locally-stored DNS blacklists; or remotely-stored DNS blacklists), for example, which list IP addresses and/or domains that are known to be associated with "spamming" or sending junk emails. If the checking result is positive, then the proxy detector may determine that a proxy server is utilized, or that more-probably than not is a proxy server utilized.

In a fifth set of embodiments, a Geo-Location Mismatch Detector 164 may operate to detect a geo-location mismatch or inconsistency or discrepancy, between (I) geo-location or geo-spatial data as associated with the alleged or the exhibited originating IP address of the end-user device, and (II) geo-location or geo-spatial data as exhibited by one or more components of the end-user device or content-items submitted by the end-user device, or other locality parameters which may be collected or extracted on the end-user device side.

For example, a Local Time Extractor 165 may operate (e.g., by injecting or adding a JavaScript code into an HTML page that is served to the end-user device from a trusted server), and may extract or determine the actual local time of the actual end-user device; and the Geo-Location Mismatch Detector 164 may determine that such actual local time differs from an estimated local time that is currently associated with the geo-located IP address; for example, the local time or local time-zone as extracted by JavaScript at the end-user device may indicate GMT-5 (e.g., extracted using JavaScript, based on the local time as managed by the local processor or CPU of the end-user device), whereas the originating IP address may be reversed-search to indicate geo-location in Italy which is GMT+1, thereby indicating that an end-user device in America is utilizing a proxy server in Italy. Applicants have realized that this method of proxy server detection may be useful, particularly since many end-user devices, smartphones, tablets and computers are typically connected to the Internet and often have their local time updated periodically from a remote server or by a time-updating module of their Operating System (OS), such as automatic setting of daylight saving time changes.

Similarly, a Preferred-Language Extractor 166 may operate to extract a preferred language of a client device (e.g., from or by using HTTP headers); and the Geo-Location Mismatch Detector 164 may detect a discrepancy or mismatch between such locally-extracted preferred language, and the geo-located country or region of the originating IP address. For example, HTTP headers or other device-parameters of the end-user device may indicate Russian as the preferred language; but a reverse lookup of the originating IP address may indicate geo-location in America; thereby supporting a determination that an end-user device is physically located in Russia and is utilizing a proxy server in America. Optionally, a lookup table or other list may be utilized, in which each geographical region or country is associated with one or more official natural language(s) or with highly-popular languages; such as, indicating that the United Kingdom is associated with English, and that the United States of America is associated with English and with Spanish (as a highly-popular language), whereas Russia is associated with the Russian language; thereby enabling the proxy detector to detect a mismatch between a preferred natural language (e.g., as extracted locally at an end-user device), and the natural language(s) that are officially used or are typically used at the geographical region that corresponds to the IP address as allegedly reported.

The above-mentioned examples of utilizing locally-extracted preferred language or time zone, are only non-limiting examples; and other suitable locality parameters may be extracted (e.g., locally at the end-user device; or remotely at a trusted server based on data or queries or headers or metadata received from or sent by the end-user device), such as, a Locality-Related Parameters Extractor 167; and such parameters may then be utilized by the Geo-Location Mismatch Detector 164 in order to detect a mismatch between (I) extracted locality-parameter(s) value(s), and (II) the estimated geo-location based on originating IP address as reported by an intermediate server or relay node or network element; thereby enabling the system to determine that a proxy server is operational, based on such mismatch or discrepancy.

A fifth set of embodiments may perform manipulation or modification of HTTP Headers, to create application-layer challenges which may be used for proxy server detection. For example, the system may intentional violate or breach the HTTP protocol (e.g., to specifically trigger some responses from a trusted server), in order to differentiate between proxy servers client-browsers and non-proxy client-browsers. For example, intentionally duplicating one or more of the HTTP response headers, may be ignored by a proxy server, but may be regarded as an error by a non-proxy client (end-user device) browser.

In a demonstrative example, an HTTP Header Modifier 168 may intentionally modify HTTP response header(s) that are sent by a trusted server to the end-user device in a manner that violates HTTP protocol (e.g., by using an HTTP response header duplicator 169 to duplicate the HTTP header); and the proxy detector may check the response or the reaction of the end-user device to such intentional violation or to such non-HTTP-compliant header. For example, if the end-user device appears to ignore the violating (e.g., duplicate) HTTP header, then it is more probable that a proxy server exists and operates; whereas, if the end-user device regards the violating or non-HTTP-compliant or duplicate header(s) as violating (e.g., reports an error, transmits a signal indicating an erroneous incoming transmission) then it is more probable that the end-user device does not utilize a proxy server to access the remote server.

A sixth set of embodiments may utilize a reverse DNS query. For example, the system may issue a DNS query about the source (or the originating) IP address; a proxy server is more-likely to have a reverse-IP record registered, compared to a non-proxy source. Additionally or alternatively, the response to the DNS query may provide other information which may be utilized for proxy detection or proxy estimation (e.g., even if only the subnet is registered). These operations may be performed by a Reverse DNS Query module 171, which may perform the reverse DNS query and may further evaluate or analyze the results of such reverse DNS query.

A seventh set of embodiments may analyze HTTP headers in order to detect or estimate proxy existence. For example, some proxy servers add or modify HTTP headers or the content of HTTP headers; such as, the content of the Via field in HTTP header(s), or the XFF (X-Forwarded For) field in HTTP header(s); and such modification may trigger the proxy server detector to determine or to estimate that a proxy server exists and operates. These operations may be performed by an HTTP Header Analyzer 172, or other suitable module or unit.

A seventh set of embodiments may perform passive fingerprinting: for example, the system may collect various channel parameters, and may use them to estimate the originating Operating System (OS) and browser software. The estimations may then be matched against the declared client OS and/or browser (e.g., obtained from the user-agent HTTP header); and a mismatch may indicate that a proxy server is being utilized. These operations may be performed by an OS & Browser Detector 173, which may perform the actual (e.g., non-reported) detection of the OS and browser based on examination of channel parameters; and which may compare them to the reported OS and/or browser identity (e.g., as reported by the User Agent record), to detect a possible proxy server. For example, even though the User Agent field as reported by the browser may report Internet Explorer browser running on Microsoft Windows operating system, an analysis of the actual transmission channel parameters and/or the actual behavior of the end-user device may indicate that it is actually running a Linux operating system and utilizing a Firefox browser; thereby triggering a detection of a proxy server.

An eighth set of embodiments may perform active fingerprinting: for example, the system utilizes a trusted server that attempts to connect to the originating IP address in one or more particular ports (e.g., port 80, port 8080, port 443, port 8888). If any of these ports replies to the trusted server, the system may determine it to be a proxy server, since end-user devices typically do not respond to connection-attempts to these particular ports. These operations may be performed by a Port(s) Connector and Analyzer 174.

A ninth set of embodiments may utilize of DNS failed requests: for example, the system utilizes a server that requests a resource under a one-time subdomain of a domain that is controlled or owned or operated by the system's administrator. Then, the system does not respond to queries from domain-name servers. When the resolvers fail, common Proxy software will try to resolve directly (e.g., the "Squid" web-proxy may utilize a built-in DNS). If the system observes that a DNS query is incoming from the same IP address as the HTTP data, then this may indicate that a proxy server is being used. These operations may be performed by a DNS Failed Requests Manager 175.

A tenth set of embodiments may perform "scraping" of websites having proxy-lists: for example, the system may continuously or periodically "scrap", download, read or review websites or web-pages that publish list(s) of known web proxies; and may collect and store proxy-identifying data from such published lists, for subsequent detection of proxy servers. A Proxy Lists Scarper and Analyzer 176 may perform such operations.

An eleventh set of embodiments may transmit data in a non-HTTP protocol, or as Active Content (e.g., using Flash to stream video), and this may causes such data not to go through proxy servers. For example, a non-HTTP protocol sender 177 or an Active Content sender 178 may send such data, and may check whether or not the end-client device received such data, in order to detect whether a proxy server exists. For example, the proxy server detector may send data which is typically dropped or not-relayed by a proxy server, and may then check locally on the end-user device whether such data was indeed received or not; such that, absence of such data at the end-user device indicates that a proxy server exists and drops (or, does not relay) such data. These operations may be performed by a Non-Relayed Data Sender 179.

A twelfth set of embodiments may utilize a WIMIA test ("What Is My IP Address" test): for example, the system may continuously gather IP-level statistics; and when multiple or numerous different-clients' sessions (e.g., more than 10, or more than 50, or more than K sessions) originate from the same IP address, that IP address may be regarded as a proxy server. These operations may be performed by a WIMIA Test Manager 181, which may collect IP address and may detect that numerous sessions of different clients originate from the same IP address, which is more-probably a web proxy or a proxy server.

A thirteenth set of embodiments may analyze or may take into account TOR ("The Onion Router") exit nodes, as the TOR network may be regarded as a specific case of proxy usage. A list of IP addresses of TOR exit nodes may be obtained from one or more sources or publicly-available records or website, and thus system may determine whether the end-user device is using TOR as proxy for connecting to the system's server. These operations may be performed by a TOR Detector 182.

A fourteenth set of embodiments may implant data or metadata inside cacheable resources, in order to later check whether fresh versions or cached versions of such data was actually received by an end-user device. For example, the system's server may serve a dynamically-generated image, where the image-bytes are a serialization of some metadata, including generation date-and-time and originating IP address. Then, a request for this image is made on every session on the client side. The encoded data or metadata is extracted and decoded, and thus it is determined if the image was cached by a proxy. For example, if the image was generated in the past (e.g., at least 1 or 2 or 12 or 24 hours ago, or at least K seconds ago or K hours ago), and was not cached by the browser, then it must have been cached by a proxy server that exists in between the trusted server and the end-user device. These operations may be performed by a metadata-inserter into cacheable resources module(s) 183, which may insert or inject such data on the trusted server side; and then, a metadata-extractor from cacheable resources module 184 may check locally on the client side whether fresh or cached data was actually received.

A fifteenth set of embodiments may attempt to upgrade or to modify or HTTP to WebSockets, in order to detect proxy server existence. WebSockets (or similar protocols) may require active participation by proxies, and will often fail when a non-supporting proxy is involved. Accordingly, failure to upgrade an HTTP connection to a WebSocket in a supporting browser, may be used as a strong indication of a proxy server. These operations may be performed by an HTTP to WebSockets Upgrader/Inspector module 185.

A fifteenth set of embodiments may utilize new HTML5 content types and protocols: the Applicants have realized that new content types, HTML tags (e.g., the <video> tag), and/or supported protocols (e.g., WebSockets, RTC, WebRTC) are continuously being implemented by browsers; and/or that often, such additional or new features become supported on end-user device browsers earlier than they become supported (or relayed) by proxy server(s). The system's server may continuously test to find small differences between how proxy servers handle such new content, compared to how client-browsers handle such new content. A suitable unit or module may thus inject or insert such content, which is already supported on one or more end-user device browser(s), but is typically not yet supported (or relayed) by web proxies or proxy servers; and may check if such content was properly received and/or rendered by the end-user device, as a condition for determining whether a proxy server exists.

Some embodiments may utilize queries to external services: for example, the system may be integrated with external IP-based fraud services; which may be utilized for every session, or only for suspicious sessions (e.g., offline, manually triggered from an analysis portal or interface).

It is noted that in accordance with the present invention, monitoring and/or analyzing of "user interactions" and/or "user gestures", may further comprise the monitoring and/or analyzing of interactions, gestures, and/or sensed data that is collected shortly before or immediately before the actual interaction, and/or interactions, gestures, and/or sensed data that is collected shortly after or immediately after the actual interaction; in addition to the data collected or sensed or monitored during the interaction itself.

The terms "mobile device" or "mobile electronic device" as used herein may include, for example, a smartphone, a cellular phone, a mobile phone, a smart-watch, a tablet, a handheld device, a portable electronic device, a portable gaming device, a portable audio/video player, an Augmented Reality (AR) device or headset or gear, a Virtual Reality (VR) device or headset or gear, or the like.

The term "pointing device" as used herein may include, for example, a mouse, a trackball, a pointing stick, a stylus, a joystick, a motion-sensing input device, a touch screen, a touch-pad, or the like.

The terms "device" or "electronic device" as used herein may include, for example, a mobile device, a non-mobile device, a non-portable device, a desktop computer, a workstation, a computing terminal, a laptop computer, a notebook computer, a netbook computer, a computing device associated with a mouse or a similar pointing accessory, a smartphone, a tablet, a smart-watch, and/or other suitable machines or devices.

The term "genuine user" as used herein may include, for example, an owner of a device; a legal or lawful user of a device; an authorized user of a device; a person who has legal authorization and/or legal right to utilize a device, for general purpose(s) and/or for one or more particular purpose(s); or the person who had originally defined user credentials (e.g., username and password) for performing an activity through the device.

The term "fraudulent user" as used herein may include, for example, any person who is not the "genuine user" of the device; an attacker; an intruder; a man-in-the-middle attacker; a man-in-the-browser attacker; an unauthorized user; an impersonator; a hacker; a cracker; a person attempting to hack or crack or compromise a security measure utilized by the device or by a system or a service or a website, or utilized by an activity or service accessible through the device; a fraudster; a human fraudster; a "bot" or a malware or an automated computerized process (e.g., implemented by using software modules and/or hardware components) which attempts to imitate human behavior or which attempts to act as if such "bot" or malware or process was the genuine user; or the like.

The present invention may be used in conjunction with various suitable devices and systems, for example, various devices that have a touch-screen; an ATM; a kiosk machine or vending machine that has a touch-screen; a touch-keyboard; a system that utilizes Augmented Reality (AR) components or AR glasses (e.g., Google Glass RTM); a device or system that may detect hovering gestures that do not necessarily touch on the screen or touch-screen; a hovering screen; a system or device that utilize brainwave analysis or brainwave control in which the user's brainwaves are captured or read and the user's brain may directly control an application on the mobile device; and/or other suitable devices or systems.

Some embodiments may identify multiple (different) users that utilize the same device, or the same account, before or after a typical user profile is built, or even during a training period in which the system learns the behavioral patterns. This may be used for detection of "friendly fraud" incidents, or identification of users for accountability purposes, or identification of the user that utilized a particular function in an Administrator account (e.g., optionally used in conjunction with a requirement that certain users, or users with certain privileges, may not share their password or credentials with any other person); or identification of a licensee in order to detect or prevent software piracy or unauthorized usage by non-licensee user(s), for software or products that are sold or licensed on a per-user basis or a per-seat basis.

Some embodiments may be utilized to identify or detect a remote access attacker, or an attacker or a user that utilizes a remote access channel to access (or to attack, or to compromise) a computerized service, or an attacker or cyber-attacker or hacker or impostor or imposter or "fraudster" that poses as a genuine user or as a true owner of an account, or an automatic script or "bot" or malware. Some embodiments may be used to differentiate or distinguish among, for example, an authorized or legitimate or genuine or human user, as opposed to an illegitimate and/or unauthorized and/or impostor human attacker or human user, and/or as opposed to a "bot" or automatic script or automated script or automated program or malware.

Some embodiments may be utilized for authenticating, or confirming the identity of, a user who is already logged-in or signed-in; or conversely, a user that did not perform (or did not yet perform, or did not complete) a log-in or sign-in process; or a user that did not successfully perform a log-in or sign-in process; or a user who is interacting with a computerized service prior to signing-in or logging in (e.g., filling-out fields in an electronic commerce website as part of checking-out as a guest), or during a log-in process, or after a log-in process; or to confirm the identity of a user who is already-logged-in, or who is not-yet logged-in, or who operates a system or service that does not necessarily require or utilize a log-in process.

The terms "service" or "computerized service", as used herein, may be or may comprise any suitable service, or system, or device, which may require user authentication in order to authorize user access to it, or in order to authorize performance of one or more particular actions; including, but not limited to, for example, user authentication for accessing or operating or unlocking an electronic device (e.g., smartphone, tablet, smart-watch, laptop computer, desktop computer, smart-home device or appliance, Internet of Things (IoT) device) or service (e.g., banking service or website, brokerage service or website, email account, webmail, social network, online vendor, online merchant, electronic commerce website or application or "app"), or other system or platform that requires user authentication (e.g., entry into, or exit from, or passage through a gate or card-reader or turnstile; to unlock or open a device or a vehicle; to start or ignite a vehicle; to drive a vehicle).

Although portions of the discussion herein relate, for demonstrative purposes, to wired links and/or wired communications, some embodiments of the present invention are not limited in this regard, and may include one or more wired or wireless links, may utilize one or more components of wireless communication, may utilize one or more methods or protocols of wireless communication, or the like. Some embodiments may utilize wired communication and/or wireless communication.

The system(s) and/or device(s) of the present invention may optionally comprise, or may be implemented by utilizing suitable hardware components and/or software components; for example, processors, processor cores, Central Processing Units (CPUs), Digital Signal Processors (DSPs), circuits, Integrated Circuits (ICs), controllers, memory units, registers, accumulators, storage units, input units (e.g., touch-screen, keyboard, keypad, stylus, mouse, touchpad, joystick, trackball, microphones), output units (e.g., screen, touch-screen, monitor, display unit, audio speakers), acoustic microphone(s) and/or sensor(s), optical microphone(s) and/or sensor(s), laser or laser-based microphone(s) and/or sensor(s), wired or wireless modems or transceivers or transmitters or receivers, GPS receiver or GPS element or other location-based or location-determining unit or system, network elements (e.g., routers, switches, hubs, antennas), and/or other suitable components and/or modules.

The system(s) and/or devices of the present invention may optionally be implemented by utilizing co-located components, remote components or modules, "cloud computing" servers or devices or storage, client/server architecture, peer-to-peer architecture, distributed architecture, and/or other suitable architectures or system topologies or network topologies.

In accordance with embodiments of the present invention, calculations, operations and/or determinations may be performed locally within a single device, or may be performed by or across multiple devices, or may be performed partially locally and partially remotely (e.g., at a remote server) by optionally utilizing a communication channel to exchange raw data and/or processed data and/or processing results.

Some embodiments may be implemented by using a special-purpose machine or a specific-purpose device that is not a generic computer, or by using a non-generic computer or a non-general computer or machine. Such system or device may utilize or may comprise one or more components or units or modules that are not part of a "generic computer" and that are not part of a "general purpose computer", for example, cellular transceivers, cellular transmitter, cellular receiver, GPS unit, location-determining unit, accelerometer(s), gyroscope(s), device-orientation detectors or sensors, device-positioning detectors or sensors, or the like.

Some embodiments may be implemented as, or by utilizing, an automated method or automated process, or a machine-implemented method or process, or as a semi-automated or partially-automated method or process, or as a set of steps or operations which may be executed or performed by a computer or machine or system or other device.

Some embodiments may be implemented by using code or program code or machine-readable instructions or machine-readable code, which may be stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such processor or machine or computer to perform a method or process as described herein. Such code or instructions may be or may comprise, for example, one or more of: software, a software module, an application, a program, a subroutine, instructions, an instruction set, computing code, words, values, symbols, strings, variables, source code, compiled code, interpreted code, executable code, static code, dynamic code; including (but not limited to) code or instructions in high-level programming language, low-level programming language, object-oriented programming language, visual programming language, compiled programming language, interpreted programming language, C, C++, C#, Java, JavaScript, SQL, Ruby on Rails, Go, Cobol, Fortran, ActionScript, AJAX, XML, JSON, Lisp, Eiffel, Verilog, Hardware Description Language (HDL, BASIC, Visual BASIC, Matlab, Pascal, HTML, HTML5, CSS, Perl, Python, PHP, machine language, machine code, assembly language, or the like.

Discussions herein utilizing terms such as, for example, "processing", "computing", "calculating", "determining", "establishing", "analyzing", "checking", "detecting", "measuring", or the like, may refer to operation(s) and/or process(es) of a processor, a computer, a computing platform, a computing system, or other electronic device or computing device, that may automatically and/or autonomously manipulate and/or transform data represented as physical (e.g., electronic) quantities within registers and/or accumulators and/or memory units and/or storage units into other data or that may perform other suitable operations.

Some embodiments of the present invention may perform steps or operations such as, for example, "determining", "identifying", "comparing", "checking", "querying", "searching", "matching", and/or "analyzing", by utilizing, for example: a pre-defined threshold value to which one or more parameter values may be compared; a comparison between (i) sensed or measured or calculated value(s), and (ii) pre-defined or dynamically-generated threshold value(s) and/or range values and/or upper limit value and/or lower limit value and/or maximum value and/or minimum value; a comparison or matching between sensed or measured or calculated data, and one or more values as stored in a look-up table or a legend table or a legend list or a database of possible values or ranges; a comparison or matching or searching process which searches for matches and/or identical results and/or similar results among multiple values or limits that are stored in a database or look-up table; utilization of one or more equations, formula, weighted formula, and/or other calculation in order to determine similarity or a match between or among parameters or values; utilization of comparator units, lookup tables, threshold values, conditions, conditioning logic, Boolean operator(s) and/or other suitable components and/or operations.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments", "some embodiments", and/or similar terms, may indicate that the embodiment(s) so described may optionally include a particular feature, structure, or characteristic, but not every embodiment necessarily includes the particular feature, structure, or characteristic. Furthermore, repeated use of the phrase "in one embodiment" does not necessarily refer to the same embodiment, although it may. Similarly, repeated use of the phrase "in some embodiments" does not necessarily refer to the same set or group of embodiments, although it may.

As used herein, and unless otherwise specified, the utilization of ordinal adjectives such as "first", "second", "third", "fourth", and so forth, to describe an item or an object, merely indicates that different instances of such like items or objects are being referred to; and does not intend to imply as if the items or objects so described must be in a particular given sequence, either temporally, spatially, in ranking, or in any other ordering manner.

Some embodiments may be used in, or in conjunction with, various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, a tablet, an on-board device, an off-board device, a hybrid device, a vehicular device, a non-vehicular device, a mobile or portable device, a consumer device, a non-mobile or non-portable device, an appliance, a wireless communication station, a wireless communication device, a wireless Access Point (AP), a wired or wireless router or gateway or switch or hub, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), or the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA or handheld device which incorporates wireless communication capabilities, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may comprise, or may be implemented by using, an "app" or application which may be downloaded or obtained from an "app store" or "applications store", for free or for a fee, or which may be pre-installed on a computing device or electronic device, or which may be otherwise transported to and/or installed on such computing device or electronic device.

In accordance with some embodiments of the present invention, a system may comprise: a proxy server detector to determine whether: (I) an end-user device is more-probably communicating indirectly with a trusted server via a proxy server, or (II) the end-user device is more-probably communicating directly with the trusted server via a proxy-less communication route.

In some embodiments, the system may comprise: a transport channel failure injector to inject a Negative Acknowledgment (NACK) into a transport channel that connects the trusted server and the end-user device; a Round-Trip Time (RTT) measurer, to measure a first RTT value that corresponds to a first RTT between the end-user device and the trusted server when a cached resource is requested, and to further measure a second RTT value that corresponds to a first RTT between the end-user device and the trusted server when a non-cached resource is requested; an RTT comparator to compare the first RTT value and the second RTT value; wherein the proxy server detector is to determine that a proxy server more-probably exists, between the end-user device and the trusted server, based on comparison of the first RTT value and the second RTT value.

In some embodiments, the system may comprise: a transport channel failure injector to inject a Negative Acknowledgment (NACK) into a transport channel that connects the trusted server and the end-user device; a Round-Trip Time (RTT) measurer, to measure a first RTT value that corresponds to a first RTT between the end-user device and the trusted server when a cached resource is requested, and to further measure a second RTT value that corresponds to a first RTT between the end-user device and the trusted server when a non-cached resource is requested; an RTT comparator to compare the first RTT value and the second RTT value; a proxy detector to determine that a proxy server more-probably exists, between the end-user device and the trusted server, if the first RTT value differs from the second RTT value by at least a pre-defined threshold difference.

In some embodiments, the system may comprise: a transport channel failure injector to inject a Reset (RST) packet into a transport channel that connects the trusted server and the end-user device; a Round-Trip Time (RTT) measurer, to measure a first RTT value that corresponds to a first RTT between the end-user device and the trusted server when a cached resource is requested, and to further measure a second RTT value that corresponds to a first RTT between the end-user device and the trusted server when a non-cached resource is requested; an RTT comparator to compare the first RTT value and the second RTT value; wherein the proxy server detector to determine that a proxy server more-probably exists, between the end-user device and the trusted server, based on comparison of the first RTT value and the second RTT value.

In some embodiments, the system may comprise: a transport channel failure injector to inject a Reset (RST) packet into a transport channel that connects a trusted server and an end-user device; a Round-Trip Time (RTT) measurer, to measure a first RTT value that corresponds to a first RTT between the end-user device and the trusted server when a cached resource is requested, and to further measure a second RTT value that corresponds to a first RTT between the end-user device and the trusted server when a non-cached resource is requested; an RTT comparator to compare the first RTT value and the second RTT value; wherein the proxy server detector to determine that a proxy server more-probably exists, between the end-user device and the trusted server, if the first RTT value differs from the second RTT value by at least a pre-defined threshold difference.

In some embodiments, the system may comprise: a Secure Socket Layer (SSL) header cipher collector, to collect SSL header ciphers that are actually used by the end-user device communicating with the trusted server; an SSL header cipher matcher, to detect a discrepancy between: (I) collected SSL header ciphers that are actually used by the end-user device, and (II) a set of SSL cipher headers that are declared by a browser of said end-user device; wherein the proxy server detector is to determine that a proxy server more-probably exists, between the end-user device and the trusted server, based on said discrepancy between: (I) collected SSL header ciphers that are actually used by the end-user device, and (II) the set of SSL cipher headers that are declared by a browser of said end-user device.

In some embodiments, the system may comprise: a Secure Socket Layer (SSL) header cipher collector, to collect SSL header ciphers that are actually used by the end-user device communicating with the trusted server; an SSL header cipher matcher, to detect a discrepancy between: (I) collected SSL header ciphers that are actually used by the end-user device, and (II) a set of SSL cipher headers that are declared by a browser of said end-user device; a spoofing detector to determine that identity spoofing is performed relative to said end-user device, based on said discrepancy between: (I) collected SSL header ciphers that are actually used by the end-user device, and (II) the set of SSL cipher headers that are declared by a browser of said end-user device.

In some embodiments, the system may comprise: a requests generator to generate a batch of TCP/IP requests; a TCP source-port identifier to identify a TCP source-port for each of the TCP/IP; a TCP source-port entropy analyzer to analyze a distribution of TCP source-ports associated with said batch; wherein the proxy server detector is to determine, based on entropy analysis of the distribution of TCP source-ports associated with said batch, that a proxy server more-probably exists, between the end-user device and the trusted server.

In some embodiments, the system may comprise: a requests generator to generate a batch of TCP/IP requests; a TCP source-port identifier to identify a TCP source-port for each of the TCP/IP; a TCP source-port sequencing analyzer to analyze a sequencing of TCP source-ports associated with said batch; wherein the proxy server detector to determine, based on sequencing analysis of the sequencing of TCP source-ports associated with said batch, that a proxy server more-probably exists, between the end-user device and the trusted server.

In some embodiments, the system may comprise: a local-time extractor to extract, locally at the end-user device, a local time zone that is reported locally at the end-user device; a geo-location mismatch detector, to detect a mismatch between: (I) the local time zone as extracted locally at the end-user device, and (II) an alleged local time zone obtained from geo-location of an originating Internet Protocol (IP) address associated with the end-user device; wherein the proxy server detector to determine that a proxy server more-probably exists, between the end-user device and the trusted server, based on a mismatch between: (I) the local time zone as extracted locally at the end-user device, and (II) the alleged local time zone obtained from geo-location of an originating Internet Protocol (IP) address associated with the end-user device.

In some embodiments, the system may comprise: a preferred-language extractor to extract, locally at the end-user device, an identifier of a preferred natural language that is reported locally at the end-user device; a geo-location mismatch detector, to detect that (I) the preferred natural language as extracted locally at the end-user device, is not an official language of (II) a geographical region associated with an originating Internet Protocol (IP) address associated with the end-user device; wherein the proxy server detector is to determine that a proxy server more-probably exists, between the end-user device and the trusted server, based on a determination that (I) the preferred natural language as extracted locally at the end-user device, is not an official language of (II) the geographical region associated with an originating Internet Protocol (IP) address associated with the end-user device.

In some embodiments, the system may comprise: an HTTP-header modifier to modify an HTTP header, that is intended for transmission to the end-user device, to be an HTTP-violating non-HTTP-compliant header; wherein the proxy server detector to perform an evaluation of a response of the end-user device to said HTTP-violating non-HTTP-compliant header, and to determine whether or not a proxy server more-probably exists, between the end-user device and the trusted server, based on said evaluation results.

In some embodiments, the system may comprise: an HTTP-header duplicator to modify an original HTTP header, that is intended for transmission to the end-user device, into a duplicate HTTP header that comprises two or more duplicate copies of said original HTTP header; wherein the proxy server detector is to perform an evaluation of a response of the end-user device to said duplicate HTTP header, and to determine whether or not a proxy server more-probably exists, between the end-user device and the trusted server, based on said evaluation results; wherein, if the proxy server detector evaluates that no error signal was received back from the end-user device in response to the duplicate HTTP header, then the proxy server detector is to determine that a proxy server more probably exists; wherein, if the proxy server detector evaluates that an error signal was received back from the end-user device in response to the duplicate HTTP header, then the proxy server detector is to determine that a proxy server more probably does not exist.

In some embodiments, the system may comprise: a reverse Domain Name Server (DNS) query module, (a) to perform a reverse DNS query on an Internet Protocol (IP) address of the end-user device, (b) to determine whether or not a reverse IP record exists for said IP address, (c) to determine that a proxy server more-probably exists, between the end-user device and the trusted server, based on determining that a reverse IP record exists for said IP address.

In some embodiments, the system may comprise: an HTTP header analyzer, (a) to perform analysis of an incoming HTTP header that is received from said end-user device; (b) to determine that said incoming HTTP header was modified relative to an expected HTTP header; (c) to determine that a proxy server more-probably exists, between the end-user device and the trusted server, based on determining that said incoming HTTP header was modified relative to the expected HTTP header.

In some embodiments, the system may comprise: an HTTP header analyzer, (a) to perform analysis of an incoming HTTP header that is received from said end-user device; (b) to determine that said incoming HTTP header was modified relative to an expected HTTP header, by detecting a particular content-item in a Via field of said incoming HTTP header; (c) to determine that a proxy server more-probably exists, between the end-user device and the trusted server, based on determining that said incoming HTTP header was modified relative to the expected HTTP header.

In some embodiments, the system may comprise: an HTTP header analyzer, (a) to perform analysis of an incoming HTTP header that is received from said end-user device; (b) to determine that said incoming HTTP header was modified relative to an expected HTTP header, by detecting a particular content-item in a X-Forwarded For (XFF) field of said incoming HTTP header; (c) to determine that a proxy server more-probably exists, between the end-user device and the trusted server, based on determining that said incoming HTTP header was modified relative to the expected HTTP header.

In some embodiments, the system may comprise: a browser identity detector, (a) to analyze transmission channel parameters, that exclude a User Agent field reported by the end-user device; (b) based on analysis of transmission channel parameters, and without relying on a User Agent field reported by the end-user device, to determine an actual browser identity of the end-user device; (c) to determine a mismatch between: (I) a reported browser identity as reported by the User Agent field of the end-user device, and (II) the actual browser identity of the end-user device as determined by the browser identity detector without relying on the User Agent field reported by the end-user device; (d) based on said mismatch, to determine that a proxy server more-probably exists between the end-user device and the trusted server.

In some embodiments, the system may comprise: an Operating System detector, (a) to analyze transmission channel parameters, that exclude a User Agent field reported by the end-user device; (b) based on analysis of transmission channel parameters, and without relying on a User Agent field reported by the end-user device, to determine an actual Operating System identity of the end-user device; (c) to determine a mismatch between: (I) a reported Operating System identity as reported by the User Agent field of the end-user device, and (II) the actual Operating System identity of the end-user device as determined by the Operating System detector without relying on the User Agent field reported by the end-user device; (d) based on said mismatch, to determine that a proxy server more-probably exists between the end-user device and the trusted server.

In some embodiments, the system may comprise: a ports connector and analyzer, (a) to attempt to connect through a particular port to an originating Internet Protocol (IP) address) of the end-user device; (b) to determine that a proxy server exists and is utilized, if a response is received to said attempt to connect through said particular port to said originating IP address of the end-user device.

In some embodiments, the system may comprise: a ports connector and analyzer, (a) to attempt to connect through a particular port to an originating Internet Protocol (IP) address) of the end-user device, wherein said particular port comprises a port selected from the group consisting of: port 80, port 8080, port 443, port 8888; and (b) to determine that a proxy server exists and is utilized, if a response is received to said attempt to connect through said particular port to said originating IP address of the end-user device.

In some embodiments, the system may comprise: a Domain Name Server (DNS) failed requests manager, (a) to send to the end-user device an outgoing request for a resource, wherein the outgoing request is sent from a one-time subdomain of a domain that is controlled by a trusted server; (b) to ignore incoming queries to resolve said one-time subdomain, that are received from Domain Name Servers; (c) to detect an incoming attempt to resolve directly said one-time subdomain; (d) based on detecting said incoming attempt to resolve directly said one-time subdomain, to determine that a proxy server exists and is utilized.

In some embodiments, the system may comprise: a proxy lists scraper and analyzer, (a) to scrape a list of proxy servers and their characteristics, and (b) to analyze incoming traffic from an end-user device, and (c) and to determine that a proxy server exists by identifying a proxy server characteristic in said incoming traffic.

In some embodiments, the system may comprise: a non-relayed-data sender, (a) to send to said end-user device a data-item that is not relayed by proxy servers; and (b) based on a local determination in said end-user device, that said data-item was not received at the end-user device, to determine that a proxy server exists.

In some embodiments, the system may comprise: an Internet Protocol (IP) addresses manager, (a) to determine IP addresses of multiple sessions that originate from different end-user devices; (b) to detect a particular IP address which is reported as originating IP address for at least K different end-user devices, wherein K is a pre-defined positive threshold value; (c) to determine that said particular IP address belongs to a proxy server.

In some embodiments, the proxy server detector is to determine that traffic from the end-user device is incoming to a trusted server from an exit node of The Onion Router (TOR) network; and to determine that the end-user device utilizes TOR network as web proxy.

In some embodiments, the system may comprise: an HTTP to WebSockets upgrader and inspector module, (a) to attempt to upgrade an HTTP connection to a WebSockets connection, (b) to detect that said attempt fails even though end-user device parameters indicate support for WebSockets, and (c) to determine that more probably a proxy server exists between the end-user device and the trusted server.

Functions, operations, components and/or features described herein with reference to one or more embodiments of the present invention, may be combined with, or may be utilized in combination with, one or more other functions, operations, components and/or features described herein with reference to one or more other embodiments of the present invention. The present invention may comprise any possible combinations, re-arrangements, assembly, re-assembly, or other utilization of some or all of the modules or functions or components that are described herein, even if they are discussed in different locations or different chapters of the above discussion, or even if they are shown across different drawings or multiple drawings.

While certain features of some demonstrative embodiments of the present invention have been illustrated and described herein, various modifications, substitutions, changes, and equivalents may occur to those skilled in the art. Accordingly, the claims are intended to cover all such modifications, substitutions, changes, and equivalents.

What is claimed is:

1. A system comprising:
a proxy server detector device able to determine that a proxy server is utilized by an end-user using a computer device over a communication network for accessing a trusted server,
wherein the proxy server detector device is configured to determine whether: (I) the end-user device is communicating indirectly with the trusted server via a proxy server, or (II) the end-user device is communicating directly with the trusted server via a proxy-less communication route;
wherein the proxy server detector device comprises:
a transport channel failure injector to inject a Negative Acknowledgment (NACK) into a transport channel that connects the trusted server and the end-user device;
a Round-Trip Time (RTT) measurer, to measure a first RTT value that corresponds to a first RTT between the end-user device and the trusted server when a cached resource is requested, and to further measure a second RTT value that corresponds to a second RTT between the end-user device and the trusted server when a non-cached resource is requested;
an RTT comparator to compare the first RTT value and the second RTT value; wherein the proxy server detector device is to determine that a proxy server exists, between the end-user device and the trusted server, based on comparison of the first RTT value and the second RTT value.

2. The system of claim 1,
wherein the proxy server detector device is to determine that a proxy server exists, between the end-user device and the trusted server, if the first RTT value differs from the second RTT value by at least a pre-defined threshold difference.

3. The system of claim 1,
wherein the transport channel failure injector is to inject a Reset (RST) packet into the transport channel that connects the trusted server and the end-user device.

4. The system of claim 1,
wherein the transport channel failure injector is to inject a Reset (RST) packet into transport channel that connects a trusted server and an end-user device.

5. The system of claim 1, comprising:
a proxy lists scraper and analyzer, (a) to scrape a list of proxy servers and their characteristics, and (b) to analyze incoming traffic from an end-user device, and (c) and to determine that a proxy server exists by identifying a proxy server characteristic in said incoming traffic.

6. The system of claim 1, comprising:
a non-relayed-data sender, (a) to send to said end-user device a data-item that is not relayed by proxy servers; and (b) based on a local determination in said end-user device, that said data-item was not received at the end-user device, to determine that a proxy server exists.

7. The system of claim 1, comprising:
a requests generator to generate a batch of TCP/IP requests;
a TCP source-port identifier to identify a TCP source-port for each of the TCP/IP;
a TCP source-port entropy analyzer to analyze a distribution of TCP source-ports associated with said batch;
wherein the proxy server detector device is to determine, based on entropy analysis of the distribution of TCP source-ports associated with said batch, that a proxy server exists, between the end-user device and the trusted server.

8. The system of claim 1, comprising:
a requests generator to generate a batch of TCP/IP requests;
a TCP source-port identifier to identify a TCP source-port for each of the TCP/IP;
a TCP source-port sequencing analyzer to analyze a sequencing of TCP source-ports associated with said batch;
wherein the proxy server detector device is to determine, based on sequencing analysis of the sequencing of TCP source-ports associated with said batch, that a proxy server exists, between the end-user device and the trusted server.

9. The system of claim 1, comprising:
a local-time extractor to extract, locally at the end-user device, a local time zone that is reported locally at the end-user device;
a geo-location mismatch detector, to detect a mismatch between: (I) the local time zone as extracted locally at the end-user device, and (II) an alleged local time zone obtained from geo-location of an originating Internet Protocol (IP) address associated with the end-user device;
wherein the proxy server detector device is to determine that a proxy server exists, between the end-user device and the trusted server, based on a mismatch between: (I) the local time zone as extracted locally at the end-user device, and (II) the alleged local time zone obtained from geo-location of an originating Internet Protocol (IP) address associated with the end-user device.

10. The system of claim 1, comprising:
a preferred-language extractor to extract, locally at the end-user device, an identifier of a preferred natural language that is reported locally at the end-user device;
a geo-location mismatch detector, to detect that (I) the preferred natural language as extracted locally at the end-user device, is not an official language of (II) a geographical region associated with an originating Internet Protocol (IP) address associated with the end-user device;
wherein the proxy server detector device is to determine that a proxy server exists, between the end-user device and the trusted server, based on a determination that (I) the preferred natural language as extracted locally at the end-user device, is not an official language of (II) the geographical region associated with an originating Internet Protocol (IP) address associated with the end-user device.

11. The system of claim 1, comprising:
an HTTP-header modifier to modify an HTTP header, that is intended for transmission to the end-user device, to be an HTTP-violating non-HTTP-compliant header;
wherein the proxy server detector device is to perform an evaluation of a response of the end-user device to said HTTP-violating non-HTTP-compliant header, and to determine whether or not a proxy server exists, between the end-user device and the trusted server, based on said evaluation results.

12. The system of claim 1, comprising:
an HTTP-header duplicator to modify an original HTTP header, that is intended for transmission to the end-user device, into a duplicate HTTP header that comprises two or more duplicate copies of said original HTTP header;
wherein the proxy server detector device is to perform an evaluation of a response of the end-user device to said duplicate HTTP header, and to determine whether or not a proxy server exists, between the end-user device and the trusted server, based on said evaluation results;
wherein, if the proxy server detector device evaluates that no error signal was received back from the end-user device in response to the duplicate HTTP header, then the proxy server detector device is to determine that a proxy server exists;
wherein, if the proxy server detector device evaluates that an error signal was received back from the end-user device in response to the duplicate HTTP header, then the proxy server detector device is to determine that a proxy server does not exist.

13. The system of claim 1, comprising:
a reverse Domain Name Server (DNS) query module,
(a) to perform a reverse DNS query on an Internet Protocol (IP) address of the end-user device,
(b) to determine whether or not a reverse IP record exists for said IP address,
(c) to determine that a proxy server exists, between the end-user device and the trusted server, based on determining that a reverse IP record exists for said IP address.

14. The system of claim 1, comprising:
an HTTP header analyzer,
(a) to perform analysis of an incoming HTTP header that is received from said end-user device;
(b) to determine that said incoming HTTP header was modified relative to an expected HTTP header;
(c) to determine that a proxy server exists, between the end-user device and the trusted server, based on determining that said incoming HTTP header was modified relative to the expected HTTP header.

15. The system of claim 1, comprising:
an HTTP header analyzer,
(a) to perform analysis of an incoming HTTP header that is received from said end-user device;
(b) to determine that said incoming HTTP header was modified relative to an expected HTTP header, by detecting a particular content-item in a Via field of said incoming HTTP header;
(c) to determine that a proxy server exists, between the end-user device and the trusted server, based on determining that said incoming HTTP header was modified relative to the expected HTTP header.

16. The system of claim 1, comprising:
an HTTP header analyzer,
(a) to perform analysis of an incoming HTTP header that is received from said end-user device;
(b) to determine that said incoming HTTP header was modified relative to an expected HTTP header, by detecting a particular content-item in a X-Forwarded For (XFF) field of said incoming HTTP header;
(c) to determine that a proxy server exists, between the end-user device and the trusted server, based on determining that said incoming HTTP header was modified relative to the expected HTTP header.

17. The system of claim 1, comprising:
a browser identity detector,
(a) to analyze transmission channel parameters, that exclude a User Agent field reported by the end-user device;
(b) based on analysis of transmission channel parameters, and without relying on a User Agent field reported by the end-user device, to determine an actual browser identity of the end-user device;
(c) to determine a mismatch between: (I) a reported browser identity as reported by the User Agent field of the end-user device, and (II) the actual browser identity of the end-user device as determined by the browser identity detector without relying on the User Agent field reported by the end-user device;
(d) based on said mismatch, to determine that a proxy server exists between the end-user device and the trusted server.

18. The system of claim 1, comprising:
an Operating System detector,
(a) to analyze transmission channel parameters, that exclude a User Agent field reported by the end-user device;
(b) based on analysis of transmission channel parameters, and without relying on a User Agent field reported by the end-user device, to determine an actual Operating System identity of the end-user device;
(c) to determine a mismatch between: (I) a reported Operating System identity as reported by the User Agent field of the end-user device, and (II) the actual Operating System identity of the end-user device as determined by the Operating System detector without relying on the User Agent field reported by the end-user device;
(d) based on said mismatch, to determine that a proxy server exists between the end-user device and the trusted server.

19. The system of claim 1, comprising:
a ports connector and analyzer,
(a) to attempt to connect through a particular port to an originating Internet Protocol (IP) address) of the end-user device;
(b) to determine that a proxy server exists and is utilized, if a response is received to said attempt to connect through said particular port to said originating IP address of the end-user device.

20. The system of claim 1, comprising:
a ports connector and analyzer,
(a) to attempt to connect through a particular port to an originating Internet Protocol (IP) address) of the end-user device, wherein said particular port comprises a port selected from the group consisting of: port 80, port 8080, port 443, port 8888;
(b) to determine that a proxy server exists and is utilized, if a response is received to said attempt to connect through said particular port to said originating IP address of the end-user device.

21. The system of claim 1, comprising:
a Domain Name Server (DNS) failed requests manager,
(a) to send to the end-user device an outgoing request for a resource, wherein the outgoing request is sent from a one-time subdomain of a domain that is controlled by a trusted server;
(b) to ignore incoming queries to resolve said one-time subdomain, that are received from Domain Name Servers;
(c) to detect an incoming attempt to resolve directly said one-time subdomain;

(d) based on detecting said incoming attempt to resolve directly said one-time subdomain, to determine that a proxy server exists and is utilized.

22. The system of claim 1, comprising:

an Internet Protocol (IP) addresses manager, (a) to determine IP addresses of multiple sessions that originate from different end-user devices;

(b) to detect a particular IP address which is reported as originating IP address for at least K different end-user devices, wherein K is a pre-defined positive threshold value;

(c) to determine that said particular IP address belongs to a proxy server.

23. The system of claim 1, wherein the proxy server detector device is to determine that traffic from the end-user device is incoming to a trusted server from an exit node of The Onion Router (TOR) network; and to determine that the end-user device utilizes TOR network as web proxy.

24. The system of claim 1, comprising:

an HTTP to WebSockets upgrader and inspector module, (a) to attempt to upgrade an HTTP connection to a WebSockets connection, (b) to detect that said attempt fails even though end-user device parameters indicate support for WebSockets, and (c) to determine that a proxy server exists between the end-user device and the trusted server.

* * * * *